US009328239B2

(12) United States Patent
Krishnaswamy

(10) Patent No.: US 9,328,239 B2
(45) Date of Patent: May 3, 2016

(54) TOUGHENING POLYLACTIC ACID WITH POLYHYDROXYALKANOATES

(75) Inventor: Rajendra K. Krishnaswamy, Lexington, MA (US)

(73) Assignee: Metabolix, Inc., Cambridge, MA (US)

( * ) Notice: Subject to any disclaimer, the term of this patent is extended or adjusted under 35 U.S.C. 154(b) by 606 days.

(21) Appl. No.: 13/698,229

(22) PCT Filed: May 17, 2011

(86) PCT No.: PCT/US2011/036808
§ 371 (c)(1),
(2), (4) Date: Nov. 15, 2012

(87) PCT Pub. No.: WO2011/146484
PCT Pub. Date: Nov. 24, 2011

(65) Prior Publication Data
US 2013/0065046 A1    Mar. 14, 2013

Related U.S. Application Data

(60) Provisional application No. 61/345,458, filed on May 17, 2010, provisional application No. 61/356,986, filed on Jun. 21, 2010.

(51) Int. Cl.
*B32B 27/08* (2006.01)
*B23B 27/18* (2006.01)
(Continued)

(52) U.S. Cl.
CPC .............. *C08L 67/04* (2013.01); *B32B 27/08* (2013.01); *B32B 27/18* (2013.01); *B32B 27/36* (2013.01); *B32B 2307/716* (2013.01); *B32B 2307/7163* (2013.01); *B32B 2367/00* (2013.01); *C08G 63/02* (2013.01); *C08G 63/06* (2013.01); *C08G 63/08* (2013.01); *C08G 63/912* (2013.01); *C08J 3/00* (2013.01); *C08J 3/20* (2013.01); *C08J 2367/04* (2013.01); *C08J 2467/04* (2013.01);
(Continued)

(58) Field of Classification Search
None
See application file for complete search history.

(56) References Cited

U.S. PATENT DOCUMENTS 5,462,983 A * 10/1995 Bloembergen et al. ......... 524/51
5,646,217 A *  7/1997 Hammond ................... 525/450
(Continued)

FOREIGN PATENT DOCUMENTS

CN       101205356        6/2008
EP       2060605 A1       5/2009
(Continued)

OTHER PUBLICATIONS

Ishida, K., et al., "Comonomer Unit Composition and Thermal Properties of Poly (3-hydroxybutyrate-co-4-hydroxybutyrate)s Biosynthesized by Ralstonia Eutrop ha.", *Biomacromolecules*, 2:1285-1293 (2001).
(Continued)

*Primary Examiner* — Vivian Chen
(74) *Attorney, Agent, or Firm* — Foley Hoag LLP

(57) ABSTRACT

Compositions of polymer blends of polylactic acid (PLA) and polyhydroxyalkanoate are described. In certain embodiments, the PHA is a multiphase copolymer blend having one phase a fully amorphous phase with a glass transition temperature of below 20° C. and is between about 5 to about 45% of the total PHA. Methods of making the compositions of the invention are also described. The invention also includes articles, films and laminates comprising the compositions.

36 Claims, 5 Drawing Sheets

(51) Int. Cl.
| | |
|---|---|
| B32B 27/36 | (2006.01) |
| C08J 3/00 | (2006.01) |
| C08J 3/20 | (2006.01) |
| C08G 63/02 | (2006.01) |
| C08G 63/06 | (2006.01) |
| C08G 63/08 | (2006.01) |
| C08G 63/91 | (2006.01) |
| C08L 67/04 | (2006.01) |
| C08L 23/08 | (2006.01) |
| C08L 33/06 | (2006.01) |
| C08K 3/04 | (2006.01) |
| C08K 3/22 | (2006.01) |
| C08K 3/28 | (2006.01) |
| C08K 3/34 | (2006.01) |
| C08K 3/36 | (2006.01) |
| C08K 5/09 | (2006.01) |
| C08K 5/14 | (2006.01) |
| C08K 5/16 | (2006.01) |
| C08K 5/52 | (2006.01) |
| C08K 5/521 | (2006.01) |
| B32B 27/18 | (2006.01) |
| C08K 3/00 | (2006.01) |
| C08K 5/00 | (2006.01) |

(52) U.S. Cl.
CPC ............. *C08K3/0008* (2013.01); *C08K 3/0033* (2013.01); *C08K 3/0041* (2013.01); *C08K 3/04* (2013.01); *C08K 3/22* (2013.01); *C08K 3/28* (2013.01); *C08K 3/34* (2013.01); *C08K 3/346* (2013.01); *C08K 3/36* (2013.01); *C08K 5/005* (2013.01); *C08K 5/0008* (2013.01); *C08K 5/0016* (2013.01); *C08K 5/0083* (2013.01); *C08K 5/09* (2013.01); *C08K 5/14* (2013.01); *C08K 5/16* (2013.01); *C08K 5/52* (2013.01); *C08K 5/521* (2013.01); *C08K 2003/2206* (2013.01); *C08L 23/08* (2013.01); *C08L 23/0884* (2013.01); *C08L 33/06* (2013.01); *C08L 33/068* (2013.01); *C08L 2201/06* (2013.01); *C08L 2203/16* (2013.01); *Y10T 428/265* (2015.01); *Y10T 428/31786* (2015.04)

(56) References Cited

U.S. PATENT DOCUMENTS

| | | | |
|---|---|---|---|
| 5,756,651 A | 5/1998 | Chen et al. | |
| 5,973,100 A * | 10/1999 | Asrar et al. | 528/176 |
| 6,096,810 A * | 8/2000 | Asrar et al. | 524/80 |
| 6,794,023 B1 * | 9/2004 | Melik et al. | 428/221 |
| 6,821,612 B1 * | 11/2004 | Melik et al. | 428/221 |
| 7,579,413 B2 * | 8/2009 | Mohanty et al. | 525/415 |
| 8,231,954 B2 * | 7/2012 | Li | C08J 3/246 215/200 |
| 2002/0143136 A1 * | 10/2002 | Noda et al. | 528/272 |
| 2003/0181555 A1 * | 9/2003 | Figuly | 524/284 |
| 2004/0213941 A1 * | 10/2004 | Whitehouse | 428/40.1 |
| 2004/0220355 A1 * | 11/2004 | Whitehouse | 525/436 |
| 2005/0137356 A1 * | 6/2005 | Hale et al. | 525/421 |
| 2006/0247387 A1 * | 11/2006 | Mohanty et al. | 525/413 |
| 2007/0027247 A1 * | 2/2007 | Ueda et al. | 524/445 |
| 2008/0027178 A1 * | 1/2008 | Uradnisheck | 525/190 |
| 2009/0191371 A1 * | 7/2009 | Uradnisheck | 428/35.7 |
| 2011/0124779 A1 * | 5/2011 | Whitehouse | C08J 3/20 524/101 |
| 2011/0189414 A1 | 8/2011 | Whitehouse | |
| 2012/0108743 A1 | 5/2012 | Krishnaswamy | |
| 2015/0132512 A1 * | 5/2015 | Krishnaswamy | C08J 3/246 428/35.2 |
| 2015/0147929 A1 * | 5/2015 | Krishnaswamy | C08J 3/246 442/199 |
| 2015/0203674 A1 * | 7/2015 | Weinlein | C08L 27/06 524/109 |

FOREIGN PATENT DOCUMENTS

| | | |
|---|---|---|
| WO | WO 02/059201 A1 | 8/2002 |
| WO | WO 2004/076582 | 9/2004 |
| WO | WO 2005/063881 A1 | 7/2005 |
| WO | WO 2011/146484 A2 | 11/2011 |
| WO | WO 2011/160053 A2 | 12/2011 |
| WO | WO 2013/184822 | 12/2013 |
| WO | WO 2013/184836 | 12/2013 |

OTHER PUBLICATIONS

International Search Report, International Application No. PCT/US2011/036808, Date of Search: Jan. 17, 2012.

International Preliminary Report on Patentability, International Application No. PCT/US2011/036808, International Filing Date May 17, 2011, entitled "Toughening Polylactic Acid With Polyhydroxyalkanoates", Date of Communication: Nov. 20, 2012.

Notification Concerning Transmittal of Copy of International Preliminary Report on Patentability, PCT/US2013/044339, "Biobased Rubber Modified BioDegradable Polymer Blends," dated Dec. 18, 2014.

Notification Concerning Transmittal of Copy of International Preliminary Report on Patentability, PCT/US2013/044367, "Low Glass Transition Polyhydroxyalkanoates for Modification of Biodegradable Polymers," dated Dec. 18, 2014.

* cited by examiner

TOUGHENING POLYLACTIC ACID WITH POLYHYDROXYALKANOATES

RELATED APPLICATIONS

This application is the U.S. National Stage of International Application No. PCT/US2011/036808, filed May 17, 2011, which designates the U.S., published in English, and claims the benefit of U.S. Provisional Application No. 61/345,458, filed May 17, 2010 and U.S. Provisional Application No. 61/356,986, filed on Jun. 21, 2010. The entire teachings of the above applications are incorporated herein by reference.

BACKGROUND OF THE INVENTION

Polylactic acid (PLA) is a commercial biobased polymer that is known to be biodegradable in an industrial composting environment. The glass transition temperature of PLA is about 55-60° C. and it can be made highly crystalline depending on its stereochemistry and processing conditions. As a result of its high crystallinity, PLA has a tensile modulus of about 2-3 GPa, which is considerably higher than that of polyethylene and polypropylene. However, the toughness of PLA is generally considered to be quite low and inadequate for many applications.

There have been several attempts to increase the toughness of PLA by blending it with other additives and polymers. One of the suppliers of PLA (INGEO®), NatureWorks, found on the world wide web at "natureworksllc" which describes some of the polymer blend approaches used to increase the toughness of PLA. While some of the polymer blend approaches show promise, the options become very limited when the biodegradability of the blend components are taken into account.

A recent review article (K. S. Anderson, et al., *Polymer Reviews*, 48, 85 (2008)) described the various approaches employed to toughen PLA using different blend components. Some plasticizers such as citrate esters help increase the toughness of PLA; however, this increase in toughness comes at the expense of tensile strength which is decreased by a factor of about seven (L. V. Labrecque, et al., *Journal of Applied Polymer Science*, 66, 1507 (1997)). The use of low molecular weight polyethylene glycol (PEG) as a polymeric plasticizer also seemed to improve the toughness of PLA; however, the tensile strength was still compromised considerably although not to the extent of the citrate ester plasticizer (M. Baiardo, et al., *Journal of Applied Polymer Science*, 90, 1731 (2003)). Polycaprolactone (PCL) is a biodegradable aliphatic polyester that has been blended with PLA with some modest improvements noted in toughness depending on the nature of the blend preparation and the use of compatibilizing agents (L. Wang, et al., *Polymer Degradation and Stability*, 59, 161 (1998); M. E. Broz, et al., *Biomaterials*, 24, 4181 (2003); H. Tsuji and Y. Ikada, *Journal of Applied Polymer Science*, 60, 2367 (1996); M. Hiljanen-Vainio, et al., *Macromolecular Chemistry and Physics*, 197, 1503 (1996)). More recently, reactive blending of PLA with polyacrylic acid followed by physical blending of polyethylene glycol in solution have shown promise for increasing PLA toughness while maintaining modulus and tensile strength (R. M. Rasal, D. E. Hirt, *Macromolecular Materials and Engineering*, 295, Iss.3, 204 (2010)). However, this process only improved the toughness of PLA by approximately 10-fold.

The most significant improvement in the toughness of PLA was reported in U.S. Pat. No. 5,883,199 by McCarthy and co-workers. In this invention, blends of PLA with polybutylene-succinate adipate (PBSA) (BIONOLLE 3001 from Showa Highpolymer Co. Ltd, Japan) showed a remarkable improvement in tensile toughness and elongation relative to the PLA homopolymer. Specifically, a 70/30 (weight percent) PLA/PBSA blend showed about a 50-fold improvement in tensile elongation to break and about a 25-fold increase in tensile toughness. However, while PBSA is a known biodegradable polymer, it is currently synthesized from petrochemical starting materials and is therefore not biobased.

Polyhydroxyalkanoates (PHAs) are a unique material to address the PLA toughness issue because PHAs are easily blended with PLA, they are biobased and biodegradable in a number of different environments. PLA/PHA blends have been prepared and characterized by several research groups. These include blends of PLA with poly-3-hydroxybutrate (P3HB) homopolymers and poly-3-hydroxybutyrate-co-hydroxyvalerate (PHBV) copolymers which showed small improvements in PLA toughness at loading levels of about 10-30 weight percent (J. S. Yoon, W. S. Lee, K. S. Kim, I. J. Chin, M. N Kim and C. Kim, *European Polymer Journal*, 36, 435 (2000); B. M. P. Ferreira, C. A. C. Zavaglia and E. A. R. Duek, *Journal of Applied Polymer Science*, 86, 2898 (2002); I. Noda, M. M. Satkowski, A. E. Dowrey and C. Marcott, *Macromolecular Bioscience*, 4, 269 (2004); K. M. Schreck and M. A Hillmeyer, *Journal of Biotechnology*, 132, 287 (2007)). Noda and co-workers (I. Noda, M. M. Satkowski, A. E. Dowrey and C. Marcott, *Macromolecular Bioscience*, 4, 269 (2004)) noted a 7-fold increase in tensile toughness in PLA at a 20 weight percent loading of a poly-3-hydroxybutyrate-co-3-hydroxyhexanoate (P3HB-3HH) copolymer only for timescales for which the PHA remained non-crystalline. It should be noted that the timescale can be theoretically manipulated to be as long as 2-4 years depending on the size-scale of the dispersed PHA domains. While an 80/20 PLA/P3HB-3HH blend appears promising, others have had difficulty reproducing this result (K. M. Schreck and M. A. Hillmeyer, *Journal of Biotechnology*, 132, 287 (2007)).

Therefore, a need exists for producing blend compositions of polylactic acid and polyhyroxyalkanoates with improved reproducible mechanical properties for the overall composition.

SUMMARY OF THE INVENTION

Described herein are polymer blend compositions of polylactic acids (PLAs) and polyhydroxyalkanoates (PHAs). In a first aspect of the invention, the polymer blend composition comprises polylactic acid and a PHA polymer, copolymer or blend thereof having a glass transition temperature of about −5° C. to about −50° C. In a second aspect of invention, the polymer blend composition is polylactic acid (PLA) and a multiphase copolymer blend of PHA, wherein one phase of the PHA copolymer blend is an amorphous rubber phase, with a glass transition temperature ($T_g$) between about −15° C. and about −40° C., and is between 5-45% of the total PHA in the composition.

In particular embodiments of the first or second aspects of the invention, the PHA comprises an amorphous rubber phase comprising a copolymer of 3-hydroxybutyrate (3HB) and 4-hydroxybutyrate (4HB) with a weight % 4HB of about 25% to about 50%, a PHA copolymer having 3HB and 4HB with a weight % 4HB of about 25% to about 40%, a PHA copolymer having 3HB and 4HB with a weight % 4HB of about 25% to about 35%, a PHA copolymer having 3HB and 3HH with a weight % 3HH of about 25% to about 50%, a copolymer having 3HB and 5-hydroxyvalerate (5HV) with a weight % of 5HV of about 25% to about 60% or copolymer having 3HB and 3-hydroxyoctanoate (3HO) with a weight % of HO of about 15% to about 60%.

In a third aspect of the invention, the composition is a blend of PLA and PHA, wherein the PHA is a blend of about 34% to about 38% P3HB, about 22% to about 26% P3HB-4HB copolymer with about 8% to about 14% 4HB by weight and about 38% to about 42% P3HB-4HB copolymer with about 25% to about 33% 4HB by weight, a plasticizer (e.g., CITROFLEX), a peroxide branching agent, a co-agent (e.g., pentaerythritol triacrylate), and may optionally further include additives (e.g., anti-slip agent(s), compatibilizer(s) (such as maleic anhydride)). Additionally, other polyesters can be added, for example, hyperbranched or dendritic polyesters.

In a fourth aspect of the invention, the composition is a blend of PLA and PHA, wherein the PHA is blend of about 10% to about 14% P3HB, about 46% to about 50% P3HB-4HB copolymer with about 8% to about 14% 4HB by weight and 38-42% P3HB-4HB copolymer with 25-33% 4HB by weight, a plasticizer (e.g., CITROFLEX), a peroxide branching agent, a co-agent (e.g., pentaerythritol triacrylate), and may optionally include additional additives (e.g., compatibilizer) and/or dendritic polyesters.

The amorphous rubber phase in these PHA blends refers to the P3HB-4HB copolymer having for example about 25% to about 33% 4HB by weight. The high 4HB content of this copolymer suppresses the crystallinity of the 3HB component producing a fully amorphous copolymer having a $T_g$ in the range of −15 to −40° C. FIG. 1 shows a DSC thermogram of the rubber phase PHA with the $T_g$ measured to be −15° C. Note that there was no $T_m$ detected by DSC in this P3HB-4HB copolymer indicating that this is a fully amorphous material.

In other embodiments of the invention, compositions of a polymer blend of polylactic acid (PLA) and a multiphase copolymer blend of PHA, wherein one phase of the PHA copolymer blend is a rubber phase with a degree of crystallinity between about 0 and 5%, a Tg between about −15° C. and about −40° C. and is between about 5% to about 45% of the total PHA are described. In particular embodiments, the rubber phase is a PHA copolymer having 3HB and 4HB with a weight % 4HB of about 25% to about 50%, a PHA copolymer having 3HB and 4HB with a weight % 4HB of about 25% to about 40%, a PHA copolymer having 3HB and 4HB with a weight % 4HB of about 25% to about 35%, a PHA copolymer having 3HB and 3HH with a weight % 3HH of about 25% to about 50%, a copolymer having 3HB and 5HV with a weight % of 5HV of about 25 to about 60% or a copolymer having 3HB and 3HO with a weight % of HO of about 15% to about 60%.

In other embodiments, the blend compositions are biodegradable, compostable and biobased.

In another embodiment of the first, second, third or fourth aspect of the invention, the compositions further include a branching agent. In particular embodiments, the branching agent is selected from: dicumyl peroxide, t-amyl-2-ethyl-hexyl peroxycarbonate, 1,1-bis(t-butylperoxy)-3,3,5-trimethylcyclohexane, 2,5-dimethyl-2,5-di(t-butylperoxy)hexane, 2,5-dimethyl-2,5-di(t-amyl peroxy)hexane, 2,5-bis(t-butylperoxy)-2,5-dimethylhexane, 2,5-dimethyl-di(t-butylperoxy)hexyne-3, di-t-butyl peroxide, benzoyl peroxide, di-t-amyl peroxide, t-butyl cumyl peroxide, n-butyl-4,4-bis(t-butylperoxy)valerate, 1,1-di(t-butylperoxy)-3,3,5-trimethyl-cyclohexane, 1,1-di(t-butylperoxy)cyclohexane, 1,1-di(t-amylperoxy)-cyclohexane, 2,2-di(t-butylperoxy)butane, ethyl-3,3-di(t-butylperoxy)butyrate, 2,2-di(t-amylperoxy)propane, ethyl-3,3-di(t-amylperoxy) butyrate, t-butylperoxy-acetate, t-amylperoxyacetate, t-butylperoxybenzoate, t-amylperoxybenzoate, and di-t-butyl-diperoxyphthalate or combinations thereof. In certain embodiments of the first, second, third and fourth aspects of the invention, the branching agent is 2,5-Dimethyl-2,5-di(tert-butylperoxy)hexane 2,5-Dimethyl-2,5-di(tert-butylperoxy)hexane.

In certain embodiments of the invention, the compositions of the first, second, third and fourth aspects of the invention are made by melt reacting the polymers with a branching agent in the presence of a co-agent (also referred to herein, as a "cross-linking agent"), thereby forming a branched polymer blend. The conditions of the reaction are suitable for reacting the branching agent alone or with a cross-linking agent and a polymer blend. A "branched" polymer is a polymer with a branching of the polymer chain or cross-linking of two or more polymer chains.

The cross-linking agent when reacted, for example, at an epoxide group(s), epoxy functional compound, or double bond(s), becomes bonded to another molecule, e.g., a polymer or branched polymer. As a consequence the multiple molecules become cross-linked through the reactive group on the cross-linking agent. An "epoxy functional compound" is a cross-linking agent comprising two or more epoxy functional groups.

In certain embodiments, the functional group of the cross-linking agent is an epoxy-functional compound, for example, an epoxy-functional styrene-acrylic polymer, an epoxy-functional acrylic copolymer, an epoxy-functional polyolefin copolymer, oligomers comprising glycidyl groups with epoxy functional side chains, an epoxy-functional poly(ethylene-glycidyl methacrylate-co-methacrylate), or an epoxidized oil, poly(ethylene-co-methacrylate-coglycidyl methacrylate, ethylene-n-butyl acrylate-glycidyl methacrylate or combinations thereof.

In other embodiment, the cross-linking agent contains at least two reactive double bonds. These cross-linking agents include but is not limited to the following: diallyl phthalate, pentaerythritol tetraacrylate, trimethylolpropane triacrylate, pentaerythritol triacrylate, dipentaerythritol pentaacrylate, diethylene glycol dimethacrylate, bis(2-methacryloxyethyl) phosphate, or combinations thereof.

One or more additives may also be included in the compositions of any of the aspects of the invention and methods of the inventions. The types of additives include but is not limited to plasticizers, clarifiers, nucleating agents, thermal stabilizers, inorganic fillers, anti-slip agents, and anti-blocking agents. Although sometimes not needed in the blend, compatibilizers can also be added. In particular embodiments of the first and second aspect of the invention, a nucleating agent is added. In other embodiments of the first and second aspects of the invention, a nucleating agent and a compatibilizer are added, in certain of these embodiments, the nucleating agent is cyanuric acid or boron nitride and the compatibilizer is maleic anhydride.

In still another embodiment, a method of making a tough, biodegradable article comprising a branched PLA and a multiphase copolymer blend of PHA, comprising the steps of: melt-blending PLA and PHA and a branching agent under conditions that cause melting and branching of the PLA/PHA blend, thereby forming a molten branched polymer composition; and forming an article from the branched molten polymer composition; thereby making an article comprising a tough, biodegradable, branched polymer composition of PLA/PHA. Articles, films and laminates comprising the compositions of the invention are also described.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

Figure 1:
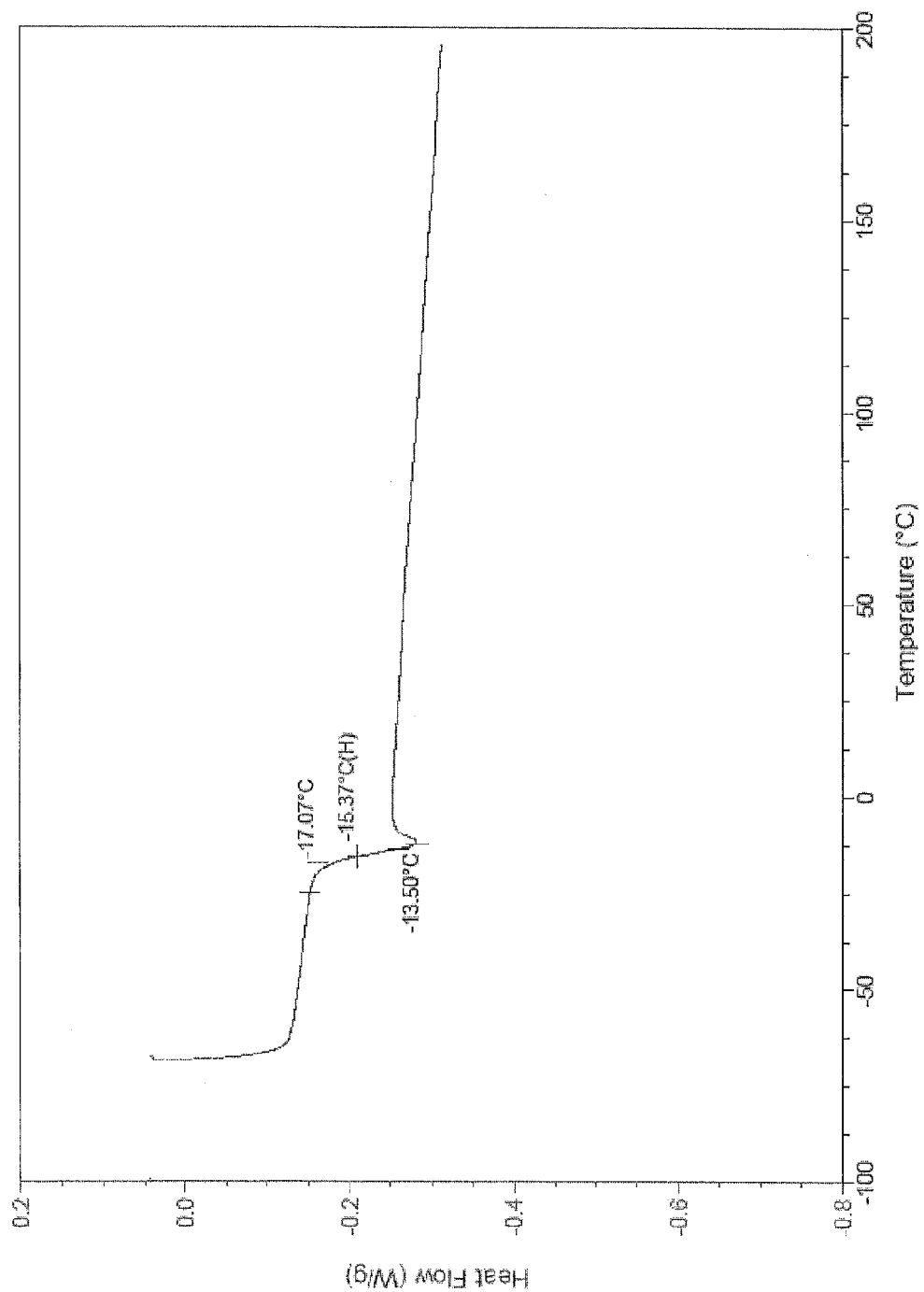
FIG. 1 is a DSC plot (second heat cycle) of rubber phase 3-hydroxybutyrate-co-4-hydroxybutyrate copolymer (P3HB-4HB copolymer) showing a Tg at −15° C. with no Tm detected indicating a fully amorphous PHA phase.
Figure 2:
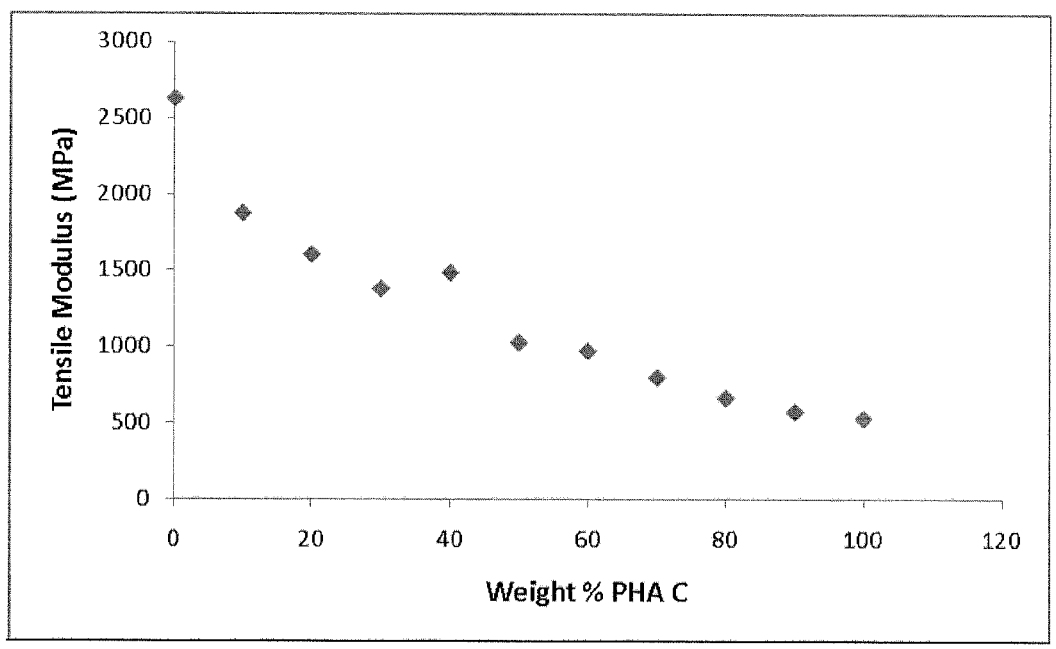
FIG. 2 is a plot showing the tensile modules versus the weigh percent of "PHA C blend" in the composition.
Figure 3:
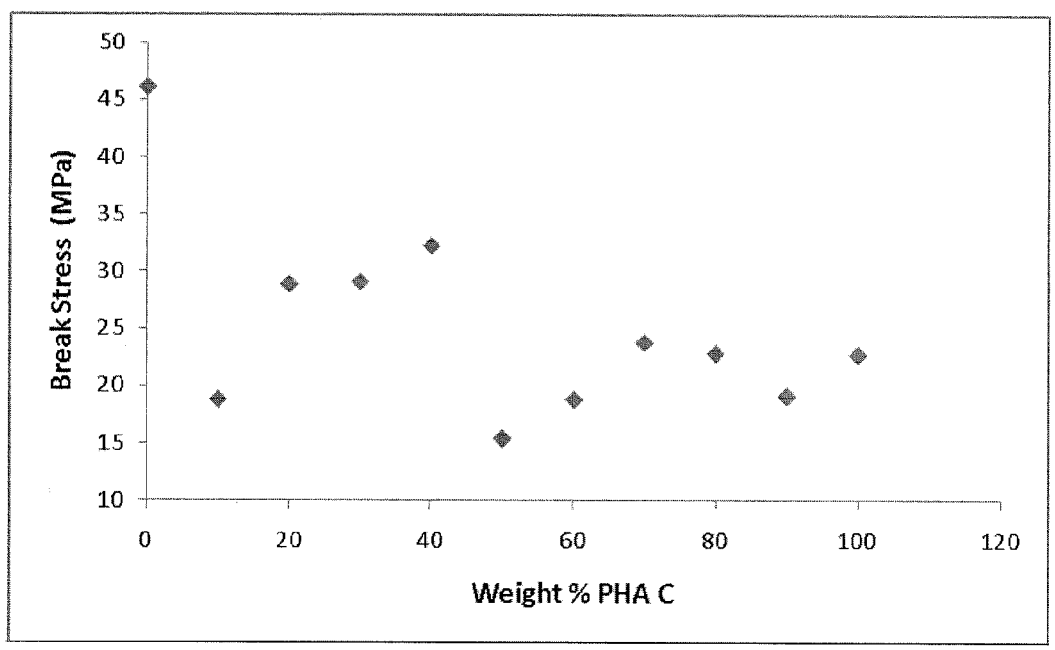
FIG. 3 is a plot showing break stress verses the weight percent of "PHA C blend" in the composition.
Figure 4:
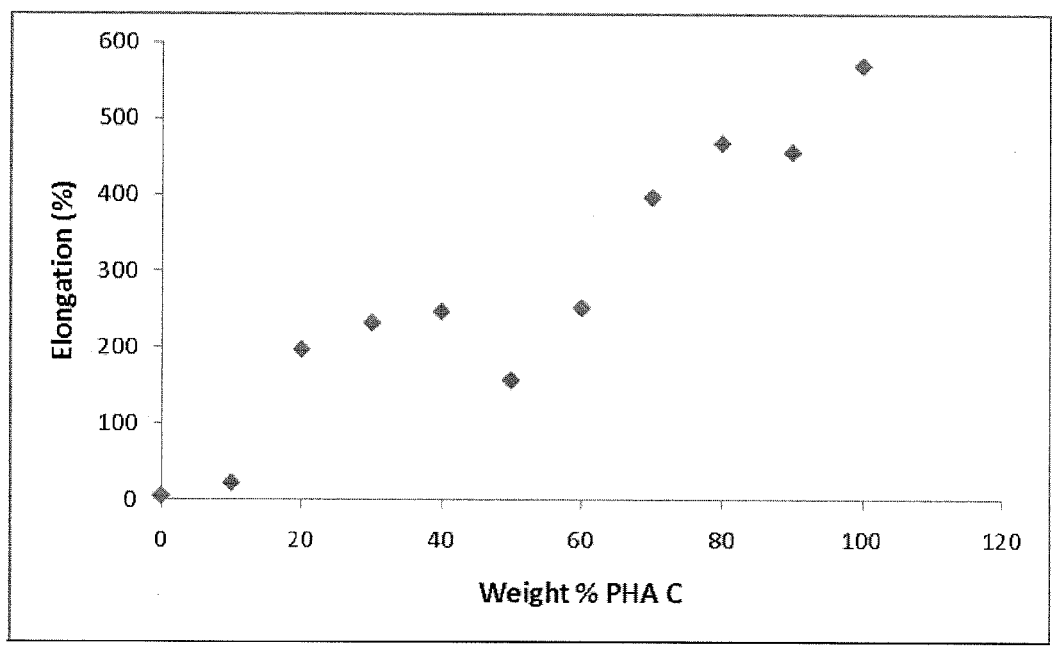
FIG. 4 is a plot showing elongation versus the weight percent of "PHA C blend" in the composition.
Figure 5:
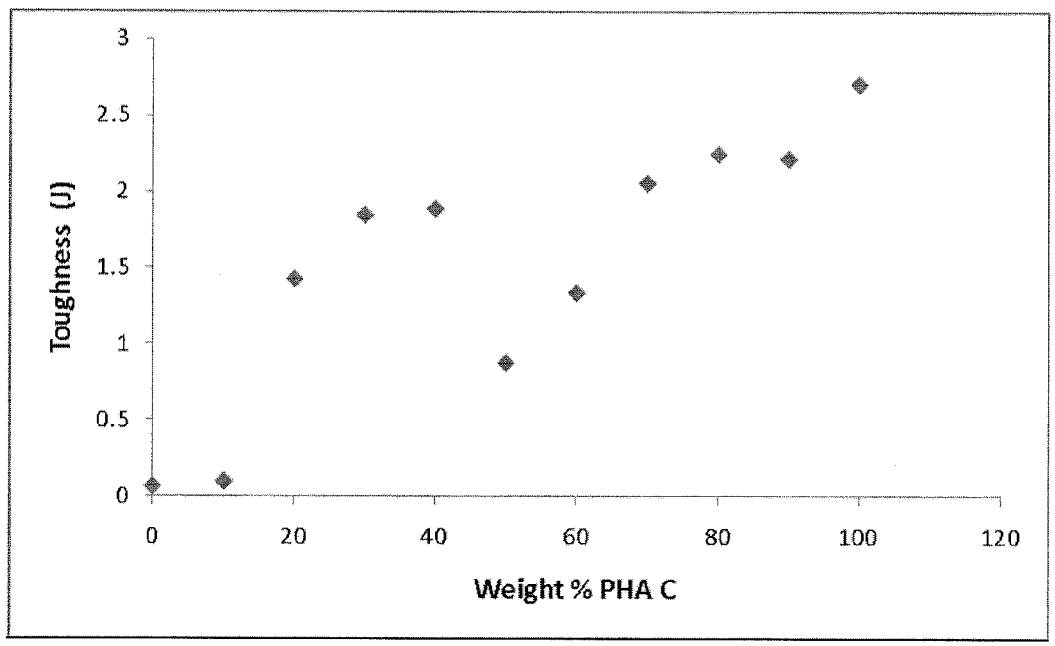
FIG. 5 is a plot showing toughness versus the weight percent of "PHA C blend" in the composition.

Described herein are compositions of polylactic acids (PLAs) and polyhydroxyalkanoates (PHAs), where the PHA component is a multiphase copolymer blend of PHA, wherein one phase of the PHA copolymer blend is an amorphous rubber phase, with a Tg between −40° C. and −15° C. and, and is between 5-45% of the total PHA in the composition. In other embodiments, the PHA blend includes one phase that is mostly amorphous with a 0-5% crytallinity, this PHA blend is referred to as containing "a rubber phase". In yet other embodiments, the compositions of PLA/PHA blends further include a branching agent and optionally a co-agent.

The PLA/PHA compositions of the invention show increased toughness relative to compositions of PLA. As disclosed herein, the toughness of PLA is increased with the addition of the multiphase copolymer blend of PHA, for example when 30 weight percent of a PHA, a 3-hydrohybutyrate-4-hydroxybutyrate-copolymer (P3HB-P4HB) PHA is blended with PLA. In certain embodiments, the PLA is reactively blended with the PHA components. In particular, when these polymers are melt-blended in the presence of an a branching agent, for example, organic peroxide, the resultant compositions display many unexpected synergies in melt rheology, thermal stability, processing and mechanical properties, such as film processing and film properties.

The toughness enhancement found was even greater in the PHA blends that were prepared using reactive melt-blending than without reactive melt-blending.

This approach produced toughness values that were statistically higher than the best values as reported with PLA/polybutylene succinic acid (PBS) or polytuylene succinic adipate (PBSA) blends in U.S. Pat. No. 5,883,199. Specifically, with about 30 weight percent of a 10-12% P4HB copolymer in a PLA composition, an approximately 60-fold increase in tensile elongation to break and an approximately 35-fold increase in tensile toughness can be achieved. This approach to improve the toughness of PLA significantly improves the overall biodegradability of the PLA blend.

The PHAs themselves include homopolymers, copolymers or blended PHAs. The fully amorphous PHAs (having 0% crystallinity and no observed melting point temperature) and mostly amorphous phase or rubber phase PHAs includes polymers of 4-hydroxybutyrate, 3-hydroxyhexanoate, 5-hydroxyvalerate or 3-hydroxyoctanoate, and combinations thereof. The resultant PHA can be a blend, copolymer, mixture or combination of one, two or three or more PHA components.

Pure P4HB homopolymer is a fully amorphous, rubbery polymer at room temperature with a significantly lower glass transition temperature ($T_g$=−40° C.) than that of pure PLA ($T_g$=55-60° C.). When it is combined with 3-hydroxybutyrate in a copolymer, where the %4HB>25% by weight, the copolymer retains its rubbery properties ($T_g$=−15° C. to −40° C.). If the rubbery PHA copolymer is blended with other polymers, it readily forms a separate rubber phase which imparts a toughening effect on the overall polymer blend. Because of this property and its proven biodegradability in various environments, it is a beneficial material for improving the toughness properties of PLA while maintaining the overall biodegradability or decomposition of the blend.

The PLAs toughness is further modified by reactive blending with the PHAs. In particular, when the PLA and PHA polymers are reactively melt-blended in the presence of a branching agent, for example, an organic peroxide, the resultant PLA/PHA blend displays significant improvements in tensile toughness and elongation which extends the product application range of the normally brittle PLA polymers. In certain aspects, the process of reactively blending the PLA and PHA together further includes the use of a co-agent, such as a multifunctional carboxylic acid acrylate, or a crosslinking agent, such as an epoxide-containing acrylate copolymer, resulting in further improvements in PLA mechanical properties.

Combining (e.g., mixing or blending) the PLA and PHA in the presence of peroxide provides the following benefits compared to combining the polymer blends or mixtures without any reactive chemistry: (1) higher tensile elongation (2) higher tensile toughness and (3) improved thermal stability and/or better melt stability, resulting in a broader processing window for the overall composition and subsequent applications of these compositions in production of articles, films and the like.

The invention provides branched PLA/PHA copolymer blend compositions and methods of preparing branched PLA/PHA blend polymers with improved tensile toughness and elongation. The polymer compositions comprise preparing branched PLA and P4HB-containing PHA compositions. The use of branching, cross-linking or co-agents further improves the desired properties of the polymer blend composition over the starting compositions without the cross-linking or co-agents and branching agents. In one aspect, the cross-linking agents comprise two or more reactive groups such as double bonds or epoxides. These cross-linking agents react with and become covalently bonded (connected) to the polymer. The connection of multiple chains through these cross-linking agents form a branched polymer blend. The branched polymer blend has increased tensile toughness and elongation over the starting polymer blend.

The temperatures experienced by a polymer during processing can cause a drop in melt strength due to thermal degradation, which can in turn cause difficulties in processing the polymer(s). Increased melt strength is therefore useful in that it allows the polymers to be processed across a broader temperature range. A broader "processing window" is especially important in certain polymer applications, such as in the production of blown film (i.e., in preventing or reducing bubble collapse), or cast film extrusion, thermoformed articles (i.e., preventing or reducing sheet sag during thermoforming), profile extruded articles (i.e., preventing or reducing sag), non-woven fibers, monofilament, etc. Additionally, articles made from the compositions described herein exhibit greater tensile toughness and elongation while maintaining biodegradability. The increases in tensile toughness can be 10 to 40 fold greater. The increases in elongation can be 10 to 60 fold greater. Tensile toughness increase can be 10-20, 20-30 or 25-35 fold. Elongation increase can be 20-30, 30-40 or 45-60 fold.

Increased melt strength is useful in that it allows the polymers to be formed under a broader temperature range when the polymer is processed. The polymer' stability at processing temperatures and can accordingly experience a drop in melt strength. This can cause difficulties in processing these polymers. Additionally, the improvement shown in films made from the methods are compositions described herein are greater tensile strength, tear resistance and greater puncture resistance.

The films produced by the compositions described herein can also be used to make laminates. The biodegradable laminates comprising the compositions of the invention are suitable for coating other layers such as paper to produce articles or containers. The laminate is produced for example by co-extruding a composition of the invention onto a paper layer or with another thermoplastic blend or composition. Other layers of thermoplastic polymers or additional layers of a composition of the invention can also be included or stacked to form laminates. For example, adhesive layers can also be added or other polymer layers that impart particular desired properties. For example, the blended materials or laminates can be different and improved by varying compositions to change the degree of hardness, softness, flexibility, tackiness, toughness, ductility, processability, opaqueness and the like. Additives, such as anti-blocking agents, plasticizers and the like are also contemplated.

In certain aspects, the laminate can be 1 to 15 layers, for example 2 layers, 3 layers, 4 layers or 5 layers, 6 layers, 7 layers, 8 layers, 10 layers, 11 layers, 12 layers, 13 layers, 14 layers or 15 layers. The overall size of the laminate is about 10 microns to about 100 microns, for example 10-50 microns, 20-60 microns, 25-75 microns. Each individual layer can be about 1 to about 2 microns, for example about 1 to about 5 micron, about 2 to about 4 microns, about 2 to about 5 microns. For each laminate, at least one layer is a composition of the invention, for example, the composition of the first, second, third or fourth aspect of the invention. In certain embodiments, the compositions of the invention comprise more than one layer, for example two, three, four or more.

The methods and branched compositions of the invention improve the melt strength of polymer compositions, a desirable property for many polymer product applications. Melt strength is a rheological property that can be measured a number of ways. One measure is G' where G' is the polymer storage modulus measured at melt processing temperatures.

As used herein, amorphous refers to the state of the PHA which is not crystalline, for example, no lattice structure characteristic of a crystalline state. The degree of crytallinity for the invention described herein is the fraction of the polymer that exists in an orderly state, having a lattice structure. In certain embodiments, one phase of the multiphase PHA is between about 0 to about 5% crystallinity, for example the degree of crystallinity in percent is about 0, or is minimally observed to be less than about 1%. In a preferred embodiment, the degree of crystallinity of one phase of the multiphase PHA is below 3%, for example, below 2% or below 1% or ranges or numbers calculated between these percentages such as 2.5%. The degree of crystallinity calculated for the compositions of the invention is minimal and can be determined by various methods, for example, density calculations, x-ray and electron diffraction, differential scanning calorimetry, infrared absorption (FTIR), Raman spectroscopy and the like.

$T_g$ is the glass transition temperature or the glass-rubber transition temperature. It is defined as the temperature where the polymer chains begin coordinated molecular motions. Physically, the polymer modulus begins to drop several orders of magnitude until the polymer finally reaches a rubbery state.

Physical properties and rheological properties of polymeric materials depend on the molecular weight and distribution of the polymer. "Molecular weight" is calculated in a number of different ways. Unless other wise indicated, "molecular weight" refers to weight average molecular weight.

"Number average molecular weight" ($M_n$) represents the arithmetic mean of the distribution, and is the sum of the products of the molecular weights of each fraction, multiplied by its mole fraction ($\Sigma N_i M_i / \Sigma N_i$).

"Weight average molecular weight" ($M_w$) is the sum of the products of the molecular weight of each fraction, multiplied by its weight fraction ($\Sigma N_i M_i^2 / \Sigma N_i M_i$). $M_w$ is generally greater than or equal to $M_n$.

The weight average molecular weight of the PHA amorphous rubber phase or the rubber phase of the multiphase PHA used in the compositions of the invention ranges between about 100,000 to about 600,000 as measured by light scattering and GPC with polystyrene standards. In particular embodiments molecular weight is about 125,000; 150,000; or about 175,000.

One way of increasing the melt strength is by branching the polymers (PLA, PHA and combinations thereof), and various methods for accomplishing this are described herein. Branching of PLA and PHAs is a result of reacting the polymers with branching agents, for example, peroxides. Also, cross-linking agents, for example, reactive compounds (compounds with epoxy groups and compounds with reactive double bonds) that enhance or increase the branching of the polymer, can also be used.

Addition of other reactive polymeric compounds, such as reactive acrylics or dendritic hydroxyls can also be employed to generate and modify the branching architecture of PLA/PHA blends. The use and selection of additives to these compositions result in improved properties. All of these methods are described herein.

The invention provides biodegradable, branched and unbranched PLA/PHA copolymer blend compositions that do not require the use of a compatibilizer for mixing and blending that other PLA/thermoplastic polymer compositions require. In these other compositions the compatibilizer is necessary to improve the properties of the blends and increase the compatibility of the polymer composition, especially immiscible polymers.

Polylactic Acid (PLA)

Polylactic acid (PLA) is a biobased, biodegradable, thermoplastic polyester that is currently being produced on a large scale for commercial applications ranging from nonwoven fibers to packaging films. Production of PLA is usually carried out by bacterial fermentation of corn sugar (dextrose) whereby the sugar is first converted into lactic acid. The lactic acid through a series of synthetic reactions is then polymerized, using tin-based catalysts, to polylactic acid. Depending on the type of catalyst employed in the synthesis, either L or D-polylactic acids (PLLA or PLDA) can be obtained. PLLA is 37% crystalline with a $T_g$ ~50-60° C. and a $T_m$ ~173-178° C. The mechanical properties of PLLA are reported as being similar to PETE. The abbreviation PLA usually refers to the PLLA structural form. When PLLA and PLDA are mixed together, they can form eutectoid stereo complexes with enhanced properties (50° C. higher $T_m$) than either PLLA or PDLA. These are being investigated as biodegradable materials for high temperature applications.

The biodegradability of PLA has been found mainly to occur through the hydrolysis of the polyester functional groups present in PLA. The degradation is essentially a two-step process whereby the PLA is first decomposed under high humidity and temperature (industrial/municipal-type composting) to produce lower molecular weight chains or lactic monomer. The second step is consumption of the low molecular weight PLA and lactic acid by microbes present in nature.

Several companies currently are manufacturing PLA from sugar feed sources. These include NatureWorks (US), Galactic (Belgium), Hycail (Netherlands), Toyota (Japan). NatureWorks, a joint venture between Cargill and Teijin operating since 2003, is currently the largest commercial producer of PLA resin.

The one drawback to processing of PLA into various products is that it is an extremely brittle material. Therefore it must be blended with other polymers in order to widen its processing window during forming. One potential problem with this approach is that additives to the PLA also have an affect on its biodegradability. The additive which has had the most success aiding in processing of PLA without adversely affecting its biodegradability is polybutylene-succinate (PBS) or polybutylene-succinate-adipate (PBSA). Both PBS and PBSA are biodegradable aliphatic polyesters. Adding high molecular weight, extrusion grade PBSA (BIONOLLE 3001 from Showa Highpolymer Co. Ltd, Japan) to PLA has resulted in the best noted improvements in overall toughness (see, e.g., U.S. Pat. No. 5,883,199, which is incorporated by reference herein in its entirety). A PLA/PBSA 70/30 blend showed an approximately 50-fold increase in tensile elongation to break and an approximately 25-fold increase in tensile toughness relative to PLA. While adding PBSA to PLA does not compromise the compostability of PLA, it dilutes the biobased content as PBS and PBSA are based on non-renewable petroleum feedstocks.

Polyhydroxyalkanoates (PHAs) are a unique solution to these problems as they are biobased, biodegradable and are readily blendable with PLA. As disclosed herein, the addition of a rubbery ($T_g$ about −15° C. to about −40° C.) for example, poly-4-hydroxybutyrate PHA to PLA, followed by reactive blending, improves the tensile toughness and elongation beyond that of the PLA/PBS or PLA/PBSA blends.

Polyhydroxyalkanoates (PHAs)

Polyhydroxyalkanoates are biological polyesters synthesized by a broad range of natural and genetically engineered bacteria as well as genetically engineered plant crops (Braunegg et al., (1998), *J. Biotechnology* 65:127-161; Madison and Huisman, 1999, *Microbiology and Molecular Biology Reviews*, 63:21-53; Poirier, 2002, *Progress in Lipid Research* 41:131-155). These polymers are biodegradable thermoplastic materials, produced from renewable resources, with the potential for use in a broad range of industrial applications (Williams & Peoples, *CHEMTECH* 26:38-44 (1996)).

Useful microbial strains for producing PHAs, include *Alcaligenes eutrophus* (renamed as *Ralstonia eutropha*), *Alcaligenes latus, Azotobacter, Aeromonas, Comamonas, Pseudomonads*, and genetically engineered organisms including genetically engineered microbes such as *Pseudomonas, Ralstonia* and *Escherichia coli*.

In general, a PHA is formed by enzymatic polymerization of one or more monomer units inside a living cell. Over 100 different types of monomers have been incorporated into the PHA polymers (Steinbüchel and Valentin, 1995, *FEMS Microbiol. Lett.* 128:219-228. Examples of monomer units incorporated in PHAs for this invention include 2-hydroxybutyrate, glycolic acid, 3-hydroxybutyrate (hereinafter referred to as 3HB), 3-hydroxypropionate (hereinafter referred to as 3HP), 3-hydroxyvalerate (hereinafter referred to as 3HV), 3-hydroxyhexanoate (hereinafter referred to as 3HH), 3-hydroxyheptanoate (hereinafter referred to as 3HH), 3-hydroxyoctanoate (hereinafter referred to as 3HO), 3-hydroxynonanoate (hereinafter referred to as 3HN), 3-hydroxydecanoate (hereinafter referred to as 3HD), 3-hydroxydodecanoate (hereinafter referred to as 3HDd), 4-hydroxybutyrate (hereinafter referred to as 4HB), 4-hydroxyvalerate (hereinafter referred to as 4HV), 5-hydroxyvalerate (hereinafter referred to as 5HV), and 6-hydroxyhexanoate (hereinafter referred to as 6HH). 3-hydroxyacid monomers incorporated into PHAs are the (D) or (R) 3-hydroxyacid isomer with the exception of 3HP which does not have a chiral center. For compositions included herein, the PHA composition does not include poly(lactic acid).

In some embodiments, the PHA in the methods described herein is a homopolymer (where all monomer units are the same). Examples of PHA homopolymers include poly 3-hydroxyalkanoates (e.g., poly 3-hydroxypropionate (hereinafter referred to as P3HP), poly 3-hydroxybutyrate (hereinafter referred to as P3HB) and poly 3-hydroxyvalerate), poly 4-hydroxyalkanoates (e.g., poly 4-hydroxybutyrate (hereinafter referred to as P4HB), or poly 4-hydroxyvalerate (hereinafter referred to as P4HV)) and poly 5-hydroxyalkanoates (e.g., poly 5-hydroxyvalerate (hereinafter referred to as P5HV)).

In certain embodiments, the starting PHA can be a copolymer (containing two or more different monomer units) in which the different monomers are randomly distributed in the polymer chain. Examples of PHA copolymers include poly 3-hydroxybutyrate-co-3-hydroxypropionate (hereinafter referred to as PHB3HP), poly 3-hydroxybutyrate-co-4-hydroxybutyrate (hereinafter referred to as P3HB4HB), poly 3-hydroxybutyrate-co-4-hydroxyvalerate (hereinafter referred to as PHB4HV), poly 3-hydroxybutyrate-co-3-hydroxyvalerate (hereinafter referred to as PHB3HV), poly 3-hydroxybutyrate-co-3-hydroxyhexanoate (hereinafter referred to as PHB3HH) and poly 3-hydroxybutyrate-co-5-hydroxyvalerate (hereinafter referred to as PHB5HV).

By selecting the monomer types and controlling the ratios of the monomer units in a given PHA copolymer a wide range of material properties can be achieved. Although examples of PHA copolymers having two different monomer units have been provided, the PHA can have more than two different monomer units (e.g., three different monomer units, four different monomer units, five different monomer units, six different monomer units) An example of a PHA having 4 different monomer units would be PHB-co-3HH-co-3HO-co-3HD or PHB-co-3-HO-co-3HD-co-3HDd (these types of PHA copolymers are hereinafter referred to as PHB3HX). Typically where the PHB3HX has 3 or more monomer units the 3HB monomer is at least 70% by weight of the total monomers, preferably 85% by weight of the total monomers, most preferably greater than 90% by weight of the total monomers for example 92%, 93%, 94%, 95%, 96% by weight of the copolymer and the HX comprises one or more monomers selected from 3HH, 3HO, 3HD, 3HDd.

The homopolymer (where all monomer units are identical) P3HB and 3-hydroxybutyrate copolymers (P3HB3HP, P3HB4HB, P3HB3HV, P3HB4HV, P3HB5HV, P3HB3HHP, hereinafter referred to as PHB copolymers) containing 3-hydroxybutyrate and at least one other monomer are of particular interest for commercial production and applications. It is useful to describe these copolymers by reference to their material properties as follows. Type 1 PHB copolymers typically have a glass transition temperature (Tg) in the range of 6° C. to −10° C., and a melting temperature $T_M$ of between 80° C. to 180° C. Type 2 PHB copolymers typically have a Tg of −20° C. to −50° C. and Tm of 55° C. to 90° C. In particular embodiments, the Type 2 copolymer has a phase component with a $T_g$ of −15° C. to −45° C. and no Tm.

Preferred Type 1 PHB copolymers have two monomer units have a majority of their monomer units being 3-hydroxybutyrate monomer by weight in the copolymer, for example, greater than 78% 3-hydroxybutyrate monomer. Preferred PHB copolymers for this invention are biologically produced from renewable resources and are selected from the following group of PHB copolymers:

PHB3HV is a Type 1 PHB copolymer where the 3HV content is in the range of 3% to 22% by weight of the polymer and preferably in the range of 4% to 15% by weight of the copolymer for example: 4% 3HV; 5% 3HV; 6% 3HV; 7% 3HV; 8% 3HV; 9% 3HV; 10% 3HV; 11% 3HV; 12% 3HV; 13% 3HV; 14% 3HV; 15% 3HV;

PHB3HP is a Type 1 PHB copolymer where the 3HP content is in the range of 3% to 15% by weight of the copolymer and preferably in the range of 4% to 15% by weight of the copolymer for example: 4% 3HP; 5% 3HP; 6% 3HP; 7% 3HP; 8% 3HP; 9% 3HP; 10% 3HP; 11% 3HP; 12% 3HP. 13% 3HP; 14% 3HP; 15% 3HP.

PHB4HB is a Type 1 PHB copolymer where the 4HB content is in the range of 3% to 15% by weight of the copolymer and preferably in the range of 4% to 15% by weight of the copolymer for example: 4% 4HB; 5% 4HB; 6% 4HB; 7% 4HB; 8% 4HB; 9% 4HB; 10% 4HB; 11% 4HB; 12% 4HB; 13% 4HB; 14% 4HB; 15% 4HB.

PHB4HV is a Type 1 PHB copolymer where the 4HV content is in the range of 3% to 15% by weight of the copolymer and preferably in the range of 4% to 15% by weight of the copolymer for example: 4% 4HV; 5% 4HV; 6% 4HV; 7% 4HV; 8% 4HV; 9% 4HV; 10% 4HV; 11% 4HV; 12% 4HV; 13% 4HV; 14% 4HV; 15% 4HV.

PHB5HV is a Type 1 PHB copolymer where the 5HV content is in the range of 3% to 15% by weight of the copolymer and preferably in the range of 4% to 15% by weight of the copolymer for example: 4% 5HV; 5% 5HV; 6% 5HV; 7% 5HV; 8% 5HV; 9% 5HV; 10% 5HV; 11% 5HV; 12% 5HV; 13% 5HV; 14% 5HV; 15% 5HV.

PHB3HH is a Type 1 PHB copolymer where the 3HH content is in the range of 3% to 15% by weight of the copolymer and preferably in the range of 4% to 15% by weight of the copolymer for example: 4% 3HH; 5% 3HH; 6% 3HH; 7% 3HH; 8% 3HH; 9% 3HH; 10% 3HH; 11% 3HH; 12% 3HH; 13% 3HH; 14% 3HH; 15% 3HH;

PHB3HX is a Type 1 PHB copolymer where the 3HX content is comprised of 2 or more monomers selected from 3HH, 3HO, 3HD and 3HDd and the 3HX content is in the range of 3% to 12% by weight of the copolymer and preferably in the range of 4% to 10% by weight of the copolymer for example: 4% 3HX; 5% 3HX; 6% 3HX; 7% 3HX; 8% 3HX; 9% 3HX; 10% 3HX by weight of the copolymer.

Type 2 PHB copolymers have a 3HB content of between 80% and 5% by weight of the copolymer, for example 80%, 75%, 70%, 65%, 60%, 55%, 50%, 45%, 40%, 35%, 30%, 25%, 20%, 15%, 10%, 5% by weight of the copolymer.

PHB4HB is a Type 2 PHB copolymer where the 4HB content is in the range of 20% to 60% by weight of the copolymer and preferably in the range of 25% to 50% by weight of the copolymer for example: 25% 4HB; 30% 4HB; 35% 4HB; 40% 4HB; 45% 4HB; 50% 4HB by weight of the copolymer.

PHB5HV is a Type 2 PHB copolymer where the 5HV content is in the range of 20% to 60% by weight of the copolymer and preferably in the range of 25% to 50% by weight of the copolymer for example: 25% 5HV; 30% 5HV; 35% 5HV; 40% 5HV; 45% 5HV; 50% 5HV by weight of the copolymer.

PHB3HH is a Type 2 PHB copolymer where the 3HH is in the range of 35% to 95% by weight of the copolymer and preferably in the range of 40% to 80% by weight of the copolymer for example: 40% 3HH; 45% 3HH; 50% 3HH; 55% 3HH, 60% 3HH; 65% 3HH; 70% 3HH; 75% 3HH; 80% 3HH by weight of the copolymer.

PHB3HX is a Type 2 PHB copolymer where the 3HX content is comprised of 2 or more monomers selected from 3HH, 3HO, 3HD and 3HDd and the 3HX content is in the range of 30% to 95% by weight of the copolymer and preferably in the range of 35% to 90% by weight of the copolymer for example: 35% 3HX; 40% 3HX; 45% 3HX; 50% 3HX; 55% 3HX 60% 3HX; 65% 3HX; 70% 3HX; 75% 3HX; 80% 3HX; 85% 3HX; 90% 3HX by weight of the copolymer.

PHAs for use in the methods, compositions and pellets described in this invention are selected from: PHB or a Type 1 PHB copolymer; a PHA blend of PHB with a Type 1 PHB copolymer where the PHB content by weight of PHA in the PHA blend is in the range of 5% to 95% by weight of the PHA in the PHA blend; a PHA blend of PHB with a Type 2 PHB copolymer where the PHB content by weight of the PHA in the PHA blend is in the range of 5% to 95% by weight of the PHA in the PHA blend; a PHA blend of a Type 1 PHB copolymer with a different Type 1 PHB copolymer and where the content of the first Type 1 PHB copolymer is in the range of 5% to 95% by weight of the PHA in the PHA blend; a PHA blend of a Type 1 PHB copolymer with a Type 2 PHA copolymer where the content of the Type 1 PHB copolymer is in the range of 30% to 95% by weight of the PHA in the PHA blend; a PHA blend of PHB with a Type 1 PHB copolymer and a Type 2 PHB copolymer where the PHB content is in the range of 10% to 90% by weight of the PHA in the PHA blend, where the Type 1 PHB copolymer content is in the range of 5% to 90% by weight of the PHA in the PHA blend and where the Type 2 PHB copolymer content is in the range of 5% to 90% by weight of the PHA in the PHA blend.

The PHA blend of PHB with a Type 1 PHB copolymer is a blend of PHB with PHB3HP where the PHB content in the PHA blend is in the range of 5% to 90% by weight of the PHA in the PHA blend and the 3HP content in the PHB3HP is in the range of 7% to 15% by weight of the PHB3HP.

The PHA blend of PHB with a Type 1 PHB copolymer is a blend of PHB with PHB3HV where the PHB content of the PHA blend is in the range of 5% to 90% by weight of the PHA in the PHA blend and the 3HV content in the PHB3HV is in the range of 4% to 22% by weight of the PHB3HV.

The PHA blend of PHB with a Type 1 PHB copolymer is a blend of PHB with PHB4HB where the PHB content of the PHA blend is in the range of 5% to 90% by weight of the PHA in the PHA blend and the 4HB content in the PHB4HB is in the range of 4% to 15% by weight of the PHB4HB.

The PHA blend of PHB with a Type 1 PHB copolymer is a blend of PHB with PHB4HV where the PHB content of the PHA blend is in the range of 5% to 90% by weight of the PHA in the PHA blend and the 4HV content in the PHB4HV is in the range of 4% to 15% by weight of the PHB4HV.

The PHA blend of PHB with a Type 1 PHB copolymer is a blend of PHB with PHB5HV where the PHB content of the PHA blend is in the range of 5% to 90% by weight of the PHA in the PHA blend and the 5HV content in the PHB5HV is in the range of 4% to 15% by weight of the PHB5HV.

The PHA blend of PHB with a Type 1 PHB copolymer is a blend of PHB with PHB3HH where the PHB content of the PHA blend is in the range of 5% to 90% by weight of the PHA in the PHA blend and the 3HH content in the PHB3HH is in the range of 4% to 15% by weight of the PHB3HH.

The PHA blend of PHB with a Type 1 PHB copolymer is a blend of PHB with PHB3HX where the PHB content of the PHA blend is in the range of 5% to 90% by weight of the PHA in the PHA blend and the 3HX content in the PHB3HX is in the range of 4% to 15% by weight of the PHB3HX.

The PHA blend is a blend of a Type 1 PHB copolymer selected from the group PHB3HV, PHB3HP, PHB4HB, PHBV, PHV4HV, PHB5HV, PHB3HH and PHB3HX with a second Type 1 PHB copolymer which is different from the first Type 1 PHB copolymer and is selected from the group PHB3HV, PHB3HP, PHB4HB, PHBV, PHV4HV, PHB5HV, PHB3HH and PHB3HX where the content of the First Type 1 PHB copolymer in the PHA blend is in the range of 10% to 90% by weight of the total PHA in the blend.

The PHA blend of PHB with a Type 2 PHB copolymer is a blend of PHB with PHB4HB where the PHB content in the PHA blend is in the range of 30% to 95% by weight of the PHA in the PHA blend and the 4HB content in the PHB4HB is in the range of 20% to 60% by weight of the PHB4HB.

The PHA blend of PHB with a Type 2 PHB copolymer is a blend of PHB with PHB5HV where the PHB content in the PHA blend is in the range of 30% to 95% by weight of the PHA in the PHA blend and the 5HV content in the PHB5HV is in the range of 20% to 60% by weight of the PHB5HV.

The PHA blend of PHB with a Type 2 PHB copolymer is a blend of PHB with PHB3HH where the PHB content in the PHA blend is in the range of 35% to 95% by weight of the PHA in the PHA blend and the 3HH content in the PHB3HH is in the range of 35% to 90% by weight of the PHB3HX.

The PHA blend of PHB with a Type 2 PHB copolymer is a blend of PHB with PHB3HX where the PHB content in the PHA blend is in the range of 30% to 95% by weight of the PHA in the PHA blend and the 3HX content in the PHB3HX is in the range of 35% to 90% by weight of the PHB3HX.

The PHA blend is a blend of PHB with a Type 1 PHB copolymer and a Type 2 PHB copolymer where the PHB content in the PHA blend is in the range of 10% to 90% by weight of the PHA in the PHA blend, the Type 1 PHB copolymer content of the PHA blend is in the range of 5% to 90% by weight of the PHA in the PHA blend and the Type 2 PHB copolymer content in the PHA blend is in the range of 5% to 90% by weight of the PHA in the PHA blend.

For example, a PHA blend can have a PHB content in the PHA blend in the range of 10% to 90% by weight of the PHA in the PHA blend, a PHB3HV content in the PHA blend in the range 5% to 90% by weight of the PHA in the PHA blend, where the 3HV content in the PHB3HV is in the range of 3% to 22% by weight of the PHB3HV, and a PHBHX content in the PHA blend in the range of 5% to 90% by weight of the PHA in the PHA blend where the 3HX content in the PHBHX is in the range of 35% to 90% by weight of the PHBHX.

For example, a PHA blend can have a PHB content in the PHA blend in the range of 10% to 90% by weight of the PHA in the PHA blend, a PHB3HV content in the PHA blend in the range 5% to 90% by weight of the PHA in the PHA blend, where the 3HV content in the PHB3HV is in the range of 3% to 22% by weight of the PHB3HV, and a PHB4HB content in the PHA blend in the range of 5% to 90% by weight of the PHA in the PHA blend where the 4HB content in the PHB4HB is in the range of 20% to 60% by weight of the PHB4HB.

For example, a PHA blend can have a PHB content in the PHA blend in the range of 10% to 90% by weight of the PHA in the PHA blend, a PHB3HV content in the PHA blend in the range 5% to 90% by weight of the PHA in the PHA blend, where the 3HV content in the PHB3HV is in the range of 3% to 22% by weight of the PHB3HV, and a PHB5HV content in the PHA blend in the range of 5% to 90% by weight of the PHA in the PHA blend where the 5HV content in the PHB5HV is in the range of 20% to 60% by weight of the PHB5HV.

For example, a PHA blend can have a PHB content in the PHA blend in the range of 10% to 90% by weight of the PHA in the PHA blend, a PHB4HB content in the PHA blend in the range 5% to 90% by weight of the PHA in the PHA blend, where the 4HB content in the PHB4HB is in the range of 4% to 15% by weight of the PHB4HB, and a PHB4HB content in the PHA blend in the range of 5% to 90% by weight of the PHA in the PHA blend where the 4HB content in the PHB4HB is in the range of 20% to 60% by weight of the PHB4HB.

For example, a PHA blend can have a PHB content in the PHA blend in the range of 10% to 90% by weight of the PHA in the PHA blend, a PHB4HB content in the PHA blend in the range 5% to 90% by weight of the PHA in the PHA blend, where the 4HB content in the PHB4HB is in the range of 4% to 15% by weight of the PHB4HB, and a PHB5HV content in the PHA blend in the range of 5% to 90% by weight of the PHA in the PHA blend and where the 5HV content in the PHB5HV is in the range of 30% to 90% by weight of the PHB5HV.

For example, a PHA blend can have a PHB content in the PHA blend in the range of 10% to 90% by weight of the PHA in the PHA blend, a PHB4HB content in the PHA blend in the range 5% to 90% by weight of the PHA in the PHA blend, where the 4HB content in the PHB4HB is in the range of 4% to 15% by weight of the PHB4HB, and a PHB3HX content in the PHA blend in the range of 5% to 90% by weight of the PHA in the PHA blend and where the 3HX content in the PHB3HX is in the range of 35% to 90% by weight of the PHB3HX.

For example, a PHA blend can have a PHB content in the PHA blend in the range of 10% to 90% by weight of the PHA in the PHA blend, a PHB4HV content in the PHA blend in the range 5% to 90% by weight of the PHA in the PHA blend, where the 4HV content in the PHB4HV is in the range of 3% to 15% by weight of the PHB4HV, and a PHB5HV content in the PHA blend in the range of 5% to 90% by weight of the PHA in the PHA blend where the 5HV content in the PHB5HV is in the range of 30% to 90% by weight of the PHB5HV.

For example, a PHA blend can have a PHB content in the PHA blend in the range of 10% to 90% by weight of the PHA in the PHA blend, a PHB3HH content in the PHA blend in the range 5% to 90% by weight of the PHA in the PHA blend, where the 3HH content in the PHB3HH is in the range of 3% to 15% by weight of the PHB3HH, and a PHB4HB content in the PHA blend in the range of 5% to 90% by weight of the PHA in the PHA blend where the 4HB content in the PHB4HB is in the range of 20% to 60% by weight of the PHB4HB.

For example, a PHA blend can have a PHB content in the PHA blend in the range of 10% to 90% by weight of the PHA in the PHA blend, a PHB3HH content in the PHA blend in the range 5% to 90% by weight of the PHA in the PHA blend, where the 3HH content in the PHB3HH is in the range of 3% to 15% by weight of the PHB3HH, and a PHB5HV content in the PHA blend in the range of 5% to 90% by weight of the PHA in the PHA blend where the 5HV content in the PHB5HV is in the range of 20% to 60% by weight of the PHB5HV.

For example, a PHA blend can have a PHB content in the PHA blend in the range of 10% to 90% by weight of the PHA in the PHA blend, a PHB3HH content in the PHA blend in the range 5% to 90% by weight of the PHA in the PHA blend, where the 3HH content in the PHB3HH is in the range of 3% to 15% by weight of the PHB3HH, and a PHB3HX content in the PHA blend in the range of 5% to 90% by weight of the PHA in the PHA blend where the 3HX content in the PHB3HX is in the range of 35% to 90% by weight of the PHB3HX.

For example, a PHA blend can have a PHB content in the PHA blend in the range of 10% to 90% by weight of the PHA in the PHA blend, a PHB3HX content in the PHA blend in the range 5% to 90% by weight of the PHA in the PHA blend, where the 3HX content in the PHB3HX is in the range of 3% to 12% by weight of the PHB3HX, and a PHB3HX content in the PHA blend in the range of 5% to 90% by weight of the PHA in the PHA blend where the 3HX content in the PHB3HX is in the range of 35% to 90% by weight of the PHB3HX.

For example, a PHA blend can have a PHB content in the PHA blend in the range of 10% to 90% by weight of the PHA in the PHA blend, a PHB3HX content in the PHA blend in the range 5% to 90% by weight of the PHA in the PHA blend, where the 3HX content in the PHB3HX is in the range of 3% to 12% by weight of the PHB3HX, and a PHB4HB content in the PHA blend in the range of 5% to 90% by weight of the PHA in the PHA blend where the 4HB content in the PHB4HB is in the range of 20% to 60% by weight of the PHB4HB.

For example, a PHA blend can have a PHB content in the PHA blend in the range of 10% to 90% by weight of the PHA in the PHA blend, a PHB3HX content in the PHA blend in the range 5% to 90% by weight of the PHA in the PHA blend, where the 3HX content in the PHB3HX is in the range of 3% to 12% by weight of the PHB3HX, and a PHB5HV content in the PHA blend in the range of 5% to 90% by weight of the PHA in the PHA blend where the 5HV content in the PHB5HV is in the range of 20% to 60% by weight of the PHB5HV.

The PHA blend is a blend as disclosed in U.S. Published Application No. US 2004/0220355, by Whitehouse, published Nov. 4, 2004, which is incorporated herein by reference in its entirety.

Microbial systems for producing the PHB copolymer PHBV are disclosed in, e.g., U.S. Pat. No. 4,477,654 to Holmes, which is incorporated herein by reference in its entirety. U.S. Published Application No. US 2002/0164729 (also incorporated herein by reference in its entirety) by Skraly and Sholl describes useful systems for producing the PHB copolymer PHB4HB. Useful processes for producing the PHB copolymer PHB3HH have been described (Lee et al., 2000, *Biotechnology and Bioengineering* 67:240-244; Park et al., 2001, *Biomacromolecules* 2:248-254). Processes for producing the PHB copolymers PHB3HX have been described by Matsusaki et al. (*Biomacromolecules* 2000, 1:17-22).

In determining the molecular weight techniques such as gel permeation chromatography (GPC) can be used. In the methodology, a polystyrene standard is utilized. The PHA can have a polystyrene equivalent weight average molecular weight (in daltons) of at least 500, at least 10,000, or at least 50,000 and/or less than 2,000,000, less than 1,000,000, less than 1,500,000, and less than 800,000. In certain embodiments, preferably, the PHAs generally have a weight-average molecular weight in the range of 100,000 to 700,000. For example, the molecular weight range for PHB and Type 1 PHB copolymers for use in this application are in the range of 400,000 daltons to 1.5 million daltons as determined by GPC method and the molecular weight range for Type 2 PHB copolymers for use in the application 100,000 to 1.5 million daltons.

In certain embodiments, the PHA can have a linear equivalent weight average molecular weight of from about 150,000 Daltons to about 500,000 Daltons and a polydispersity index of from about 2.5 to about 8.0. As used herein, weight average molecular weight and linear equivalent weight average molecular weight are determined by gel permeation chromatography, using, e.g., chloroform as both the eluent and diluent for the PHA samples. Calibration curves for determining molecular weights are generated using linear polystyrenes as molecular weight standards and a 'log MW vs elution volume' calibration method.

Blends of PLA with PHA and Combinations Thereof

In certain embodiments, the polymers for use in the methods and compositions are blended in the presence of additives (e.g., nucleating agent(s), compatibilizer(s), anti-slip additive(s) and the like, co-agents and branching agents to form compositions with improved toughness properties. The percentages of PLA in the PLA/PHA blend are 50% to 95% by weight, for example 70-95%. In certain compositions of the invention, the percentages of PLA and PHA of the total polymer compositions ranges from about 95% PLA to about 5% PHA or about 50% PLA to about 50% PHA. For example the PLA/PHA ratio can be 95/5, 90/10, 85/15, 80/20, 75/25, 70/30, 65/35, 60/40, 55/45 or 50/50.

Branched Polylactic Acid and Polyhydroxyalkanoates

The term "branched polymer" refers to a PLA or PHA with branching of the chain and/or cross-linking of two or more chains. Branching on side chains is also contemplated. Branching can be accomplished by various methods. PLA/PHA polymer blends described above can be branched by branching agents by free-radical-induced cross-linking of the polymer. Polyhydroxyalkanoate polymers can be branched in any of the ways described in U.S. Pat. Nos. 6,620,869, 7,208, 535, 6,201,083, 6,156,852, 6,248,862, 6,201,083 and 6,096, 810 all of which are incorporated herein by reference in their entirety.

The polymers of the invention can also be branched according to any of the methods disclosed in International Publication No. WO 2010/008447, titled "Methods For Branching PHA Using Thermolysis" or International Publication No. WO 2010/008445, titled "Branched PHA Compositions, Methods For Their Production, And Use In Applications," both of which were published in English on Jan. 21, 2010, and designated the United States. These applications are incorporated by reference herein in their entirety.

Branching Agents

The branching agents, also referred to as free radical initiators, for use in the compositions and method described herein include organic peroxides. Peroxides are reactive molecules, and react with polymer molecules or previously branched polymers by removing a hydrogen atom from the polymer backbone, leaving behind a radical. Polymer molecules having such radicals on their backbone are free to combine with each other, creating branched polymer molecules. Branching agents are selected from any suitable initiator known in the art, such as peroxides, azo-dervatives (e.g., azo-nitriles), peresters, and peroxycarbonates. Suitable peroxides for use in the present invention include, but are not limited to, organic peroxides, for example dialkyl organic peroxides such as 2,5-dimethyl-2,5-di(t-butylperoxy)hexane, 2,5-dimethyl-2,5-di(t-amylperoxy)hexane, 2,5-bis(t-butylperoxy)-2,5-dimethylhexane (available from Akzo Nobel as TRIGANOX® 101), 2,5-dimethyl-di(t-butylperoxy)hexyne-3, di-t-butyl peroxide, dicumyl peroxide, benzoyl peroxide, di-t-amyl peroxide, t-amylperoxy-2-ethylhexylcarbonate (TAEC), t-butyl cumyl peroxide, n-butyl-4,4-bis(t-butylperoxy)valerate, 1,1-di(t-butylperoxy)-3,3,5-trimethyl-cyclohexane, 1,1-bis(t-butylperoxy)-3,3,5-trimethylcyclohexane (CPK), 1,1-di(t-butylperoxy)cyclohexane, 1,1-di(t-amylperoxy)-cyclohexane, 2,2-di(t-butylperoxy)butane, ethyl-3,3-di(t-butylperoxy)butyrate, 2,2-di(t-amylperoxy)propane, ethyl-3,3-di(t-amylperoxy)butyrate, t-butylperoxy-acetate, t-amylperoxyacetate, t-butylperoxybenzoate, t-amylperoxybenzoate, di-t-butyldiperoxyphthalate, and the like. Combinations and mixtures of peroxides can also be used. Examples of free radical initiators include those mentioned herein, as well as those described in, e.g., *Polymer Handbook*, 3$^{rd}$ Ed., J. Brandrup & E. H. Immergut, John Wiley and Sons, 1989, Ch. 2. Irradiation (e.g., e-beam or gamma irradiation) can also be used to generate polymer branching.

As discussed above, when peroxides decompose, they form very high energy radicals that can extract a hydrogen atom from the polymer backbone. These radicals have short half-lives, thereby limiting the population of branched molecules that is produced during the active time period.

Additives

In certain embodiments, various additives are added to the compositions. Examples of these additives include, but are not limited to, antioxidants, pigments, compatibilizers, thermal and UV stabilizers, inorganic and organic fillers, plasticizers, nucleating agents, anti-slip agents, anti-blocking agents and radical scavengers. Additionally, polyfunctional co-agents such as divinyl benzene, triallyl cyanurate and the like may be added. Such co-agents can be added to one or more of these additives for easier incorporation into the polymer. For instance, the co-agent can be mixed with a plasticizer, e.g., a non-reactive plasticizer, e.g., a citric acid ester, and then compounded with the polymer under conditions to induce branching. Other co-agents useful in the compositions of invention, for example, compositions of the first, second, third or fourth aspect are hyperbranched or dendritic polyesters, such as dendrtic and hyperbranched acrylates those sold by Sartomer, e.g., BOLTRON™ H2O.

In poly-3-hydroxybutyrate compositions for use in the methods and compositions described herein, for example, plasticizers are often used to change the glass transition temperature and modulus of the composition, but surfactants may also be used. Lubricants may also be used, e.g., in injection molding applications. Plasticizers, surfactants and lubricants may all therefore be included in the overall composition.

In other embodiments, the compositions and methods of the invention include one or more plasticizers. Examples of plasticizers include phthalic compounds (including, but not limited to, dimethyl phthalate, diethyl phthalate, dibutyl phthalate, dihexyl phthalate, di-n-octyl phthalate, di-2-ethylhexyl phthalate, diisooctyl phthalate, dicapryl phthalate, dinonyl phthalate, diisononyl phthalate, didecyl phthalate, diundecyl phthalate, dilauryl phthalate, ditridecyl phthalate, dibenzyl phthalate, dicyclohexyl phthalate, butyl benzyl phthalate, octyl decyl phthalate, butyl octyl phthalate, octyl benzyl phthalate, n-hexyl n-decyl phthalate, n-octyl phthalate, and n-decyl phthalate), phosphoric compounds (including, but not limted to, tricresyl phosphate, trioctyl phosphate, triphenyl phosphate, octyl diphenyl phosphate, cresyl diphenyl phosphate, and trichloroethyl phosphate), adipic compounds (including, but not limited to, dibutoxyethoxyethyl adipate (DBEEA), dioctyl adipate, diisooctyl adipate, di-n-octyl adipate, didecyl adipate, diisodecyl adipate, n-octyl n-decyl adipate, n-heptyl adipate, and n-nonyl adipate), sebacic compounds (including, but not limited to, dibutyl sebacate, dioctyl sebacate, diisooctyl sebacate, and butyl benzyl sebacate), azelaic compounds, citric compounds (including, but not limited to, triethyl citrate, acetyl triethyl citrate, tributyl citrate, acetyl tributyl citrate, and acetyl trioctyl citrate), glycolic compounds (including, but not limited to, methyl phthalyl ethyl glycolate, ethyl phthalyl ethyl glycolate, and butyl phthalyl ethyl glycolate), trimellitic compounds (including, but not limited to, trioctyl trimellitate and tri-n-octyl n-decyl trimellitate), phthalic isomer compounds (including, but not limited to, dioctyl isophthalate and dioctyl terephthalate), ricinoleic compounds (including, but not limited to, methyl acetyl, recinoleate and butyl acetyl recinoleate), polyester compounds (including, but not limited to reaction products of diols selected from butane diol, ethylene glycol, propane 1,2 diol, propane 1,3 diol, polyethylene glycol, glycerol, diacids selected from adipic acid, succinic acid, succinic anhydride and hydroxyacids such as hydroxystearic acid, epoxidized soy bean oil, chlorinated paraffins, chlorinated fatty acid esters, fatty acid compounds, plant oils, pigments, and acrylic compounds. The plasticizers may be used either alone respectively or in combinations with each other.

In certain embodiments, the compositions and methods of the invention include one or more surfactants. Surfactants are generally used to de-dust, lubricate, reduce surface tension, and/or densify. Examples of surfactants include, but are not limited to mineral oil, castor oil, and soybean oil. One mineral oil surfactant is Drakeol 34, available from Penreco (Dickinson, Tex., USA). Maxsperse W-6000 and W-3000 solid surfactants are available from Chemax Polymer Additives (Piedmont, S.C., USA). Non-ionic surfactants with HLB values ranging from about 2 to about 16 can be used, examples being TWEEN-20, TWEEN-65, Span-40 and Span 85.

Anionic surfactants include: aliphatic carboxylic acids such as lauric acid, myristic acid, palmitic acid, stearic acid, and oleic acid; fatty acid soaps such as sodium salts or potassium salts of the above aliphatic carboxylic acids; N-acyl-N-methylglycine salts, N-acyl-N-methyl-beta-alanine salts, N-acylglutamic acid salts, polyoxyethylene alkyl ether carboxylic acid salts, acylated peptides, alkylbenzenesulfonic acid salts, alkylnaphthalenesulfonic acid salts, naphthalenesulfonic acid salt-formalin polycondensation products, melaminesulfonic acid salt-formalin polycondensation products, dialkylsulfosuccinic acid ester salts, alkyl sulfosuccinate disalts, polyoxyethylene alkylsulfosuccinic acid disalts, alkylsulfoacetic acid salts, (alpha-olefinsulfonic acid salts, N-acylmethyltaurine salts, sodium dimethyl 5-sulfoisophthalate, sulfated oil, higher alcohol sulfuric acid ester salts, polyoxyethylene alkyl ether sulfuric acid salts, secondary higher alcohol ethoxysulfates, polyoxyethylene alkyl phenyl ether sulfuric acid salts, monoglysulfate, sulfuric acid ester salts of fatty acid alkylolamides, polyoxyethylene alkyl ether phosphoric acid salts, polyoxyethylene alkyl phenyl ether phosphoric acid salts, alkyl phosphoric acid salts, sodium alkylamine oxide bistridecylsulfosuccinates, sodium dioctylsulfosuccinate, sodium dihexylsulfosuccinate, sodium dicyclohexylsulfosuccinate, sodium diamylsulfosuccinate, sodium diisobutylsulfosuccinate, alkylamine guanidine polyoxyethanol, disodium sulfosuccinate ethoxylated alcohol half esters, disodium sulfosuccinate ethoxylated nonylphenol half esters, disodium isodecylsulfosuccinate, disodium N-octadecylsulfosuccinamide, tetrasodium N-(1,2-dicarboxyethyl)-N-octadecylsulfosuccinamide, disodium mono- or didodecyldiphenyl oxide disulfonates, sodium diisopropylnaphthalenesulfonate, and neutralized condensed products from sodium naphthalenesulfonate.

One or more lubricants can also be added to the compositions and methods of the invention. Lubricants are normally used to reduce sticking to hot processing metal surfaces and can include polyethylene, paraffin oils, and paraffin waxes in combination with metal stearates. Other lubricants include stearic acid, amide waxes, ester waxes, metal carboxylates, and carboxylic acids. Lubricants are normally added to polymers in the range of about 0.1 percent to about 1 percent by weight, generally from about 0.7 percent to about 0.8 percent by weight of the compound. Solid lubricants is warmed and melted before or during processing of the blend.

In film applications of the compositions and methods described herein, anti-block masterbatch is also added. A suitable example is a slip anti-block masterbatch mixture of erucamide (20% by weight) diatomaceous earth (15% by weight) nucleant masterbatch (3% by weight), pelleted into PHA (62% by weight). Others are known to those of ordinary skill in the field of polymer processing.

Cross-linking Agents

Cross-linking agents, also referred to as co-agents, used in the methods and compositions of the invention are cross-linking agents comprising two or more reactive functional groups such as epoxides or double bonds. These cross-linking agents modify the properties of the polymer. These properties include, but are not limited to, melt strength or toughness. One type of cross-linking agent is an "epoxy functional compound." As used herein, "epoxy functional compound" is meant to include compounds with two or more epoxide groups capable of increasing the melt strength of polyhydroxyalkanoate polymers by branching, e.g., end branching as described above.

When an epoxy functional compound is used as the cross-linking agent in the disclosed methods, a branching agent is optional. As such one embodiment of the invention is a method of branching a starting polyhydroxyalkanoate polymer (PHA), comprising reacting a starting PITA with an epoxy functional compound. Alternatively, the invention is a method of branching a starting polyhydroxyalkanoate polymer, comprising reacting a starting PHA, a branching agent and an epoxy functional compound. Alternatively, the invention is a method of branching a starting polyhydroxyalkanoate polymer, comprising reacting a starting PHA, and an epoxy functional compound in the absence of a branching agent. Such epoxy functional compounds can include epoxy-functional, styrene-acrylic polymers (such as, but not limited to, e.g., JONCRYL® ADR-4368 (BASF), or MP-40 (Kaneka)), acrylic and/or polyolefin copolymers and oligomers containing glycidyl groups incorporated as side chains (such as, but not limited to, e.g., LOTADER® (Arkema), poly(ethylene-glycidyl methacrylate-co-methacrylate)), and epoxidized oils (such as, but not limited to, e.g., epoxidized soybean, olive, linseed, palm, peanut, coconut, seaweed, cod liver oils, or mixtures thereof, e.g., Merginat ESBO (Hobum, Hamburg, Germany) and EDENOL® B 316 (Cognis, Dusseldorf, Germany)).

For example, reactive acrylics or functional acrylics cross-linking agents are used to increase the molecular weight of the polymer in the branched polymer compositions described herein. Such cross-linking agents are sold commercially. BASF, for instance, sells multiple compounds under the trade name JONCRYL®, which are described in U.S. Pat. No. 6,984,694 to Blasius et al., "Oligomeric chain extenders for processing, post-processing and recycling of condensation polymers, synthesis, compositions and applications," incorporated herein by reference in its entirety. One such compound is JONCRYL® ADR-4368CS, which is styrene glycidyl methacrylate and is discussed below. Another is MP-40 (Kaneka). And still another is the Petra line from Honeywell, see for example, U.S. Pat. No. 5,723,730. Such polymers are often used in plastic recycling (e.g., in recycling of polyethylene terephthalate) to increase the molecular weight (or to mimic the increase of molecular weight) of the polymer being recycled. Such polymers often have the general structure:

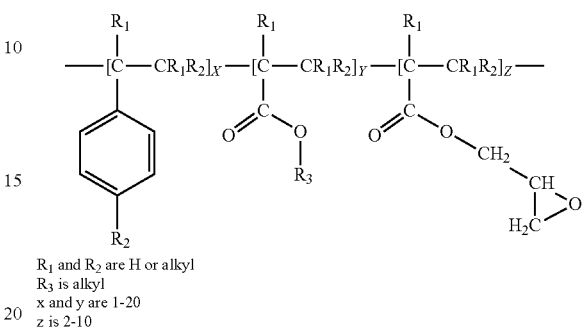

$R_1$ and $R_2$ are H or alkyl
$R_3$ is alkyl
x and y are 1-20
z is 2-10

E.I. du Pont de Nemours & Company sells multiple reactive compounds under the trade name ELVALOY®, which are ethylene copolymers, such as acrylate copolymers, elastomeric terpolymers, and other copolymers. One such compound is ELVALOY® PTW, which is a copolymer of ethylene-n-butyl acrylate and glycidyl methacrylate. Omnova sells similar compounds under the trade names "SX64053," "SX64055," and "SX64056." Other entities also supply such compounds commercially.

Specific polyfunctional polymeric compounds with reactive epoxy functional groups are the styrene-acrylic copolymers. These materials are based on oligomers with styrene and acrylate building blocks that have glycidyl groups incorporated as side chains. A high number of epoxy groups per oligomer chain are used, for example 5, greater than 10, or greater than 20. These polymeric materials generally have a molecular weight greater than 3000, specifically greater than 4000, and more specifically greater than 6000. These are commercially available from S.C. Johnson Polymer, LLC (now owned by BASF) under the trade name JONCRYL®, ADR 4368 material. Other types of polyfunctional polymer materials with multiple epoxy groups are acrylic and/or polyolefin copolymers and oligomers containing glycidyl groups incorporated as side chains. A further example of such a polyfunctional carboxy-reactive material is a co- or ter-polymer including units of ethylene and glycidyl methacrylate (GMA), available under the trade name LOTADER® resin, sold by Arkema. These materials can further comprise methacrylate units that are not glycidyl. An example of this type is poly(ethylene-glycidyl methacrylate-co-methacrylate).

Fatty acid esters or naturally occurring oils containing epoxy groups (epoxidized) can also be used. Examples of naturally occurring oils are olive oil, linseed oil, soybean oil, palm oil, peanut oil, coconut oil, seaweed oil, cod liver oil, or a mixture of these compounds. Particular preference is given to epoxidized soybean oil (e.g., Merginat ESBO from Hobum, Hamburg, or EDENOL® B 316 from Cognis, Dusseldorf), but others may also be used.

Another type of cross-linking agent are agents with two or more double bonds. Cross-linking agents with two or more double bond cross-link PHAs by after reacting at the double bonds. Examples of these include: diallyl phthalate, pentaerythritol tetraacrylate, trimethylolpropane triacrylate, pentaerythritol triacrylate, dipentaerythritol pentaacrylate, diethylene glycol dimethacrylate, bis(2-methacryloxyethyl)phosphate.

In general, it appears that compounds with terminal epoxides perform better than those with epoxide groups located elsewhere on the molecule.

Compounds having a relatively high number of end groups are the most desirable. Molecular weight may also play a role in this regard, and compounds with higher numbers of end groups relative to their molecular weight (e.g., the JONCRYL®s are in the 3000-4000 g/mol range) are likely to perform better than compounds with fewer end groups relative to their molecular weight (e.g., the Omnova products have molecular weights in the 100,000-800,000 g/mol range).

Nucleating Agents

If desired, an optional nucleating agent is added to the compositions of the invention to aid in its crystallization. In certain embodiments, the nucleating agent aids in the crystallization of the compositions. Nucleating agents for various polymers are simple substances, metal compounds including composite oxides, for example, carbon black, calcium carbonate, synthesized silicic acid and salts, silica, zinc white, clay, kaolin, basic magnesium carbonate, mica, talc, quartz powder, diatomite, dolomite powder, titanium oxide, zinc oxide, antimony oxide, barium sulfate, calcium sulfate, alumina, calcium silicate, metal salts of organophosphates, and boron nitride; low-molecular organic compounds having a metal carboxylate group, for example, metal salts of such as octylic acid, toluic acid, heptanoic acid, pelargonic acid, lauric acid, myristic acid, palmitic acid, stearic acid, behenic acid, cerotic acid, montanic acid, melissic acid, benzoic acid, p-tert-butylbenzoic acid, terephthalic acid, terephthalic acid monomethyl ester, isophthalic acid, and isophthalic acid monomethyl ester; high-molecular organic compounds having a metal carboxylate group, for example, metal salts of such as: carboxyl-group-containing polyethylene obtained by oxidation of polyethylene; carboxyl-group-containing polypropylene obtained by oxidation of polypropylene; copolymers of olefins, such as ethylene, propylene and butene-1, with acrylic or methacrylic acid; copolymers of styrene with acrylic or methacrylic acid; copolymers of olefins with maleic anhydride; and copolymers of styrene with maleic anhydride; high-molecular organic compounds, for example: alpha-olefins branched at their 3-position carbon atom and having no fewer than 5 carbon atoms, such as 3,3 dimethylbutene-1,3-methylbutene-1,3-methylpentene-1,3-methylhexene-1, and 3,5,5-trimethylhexene-1; polymers of vinylcycloalkanes such as vinylcyclopentane, vinylcyclohexane, and vinylnorbornane; polyalkylene glycols such as polyethylene glycol and polypropylene glycol; poly(glycolic acid); cellulose; cellulose esters; and cellulose ethers; phosphoric or phosphorous acid and its metal salts, such as diphenyl phosphate, diphenyl phosphite, metal salts of bis(4-tert-butylphenyl)phosphate, and methylene bis-(2,4-tert-butylphenyl)phosphate; sorbitol derivatives such as bis(p-methylbenzylidene)sorbitol and bis(p-ethylbenzylidene)sorbitol; and thioglycolic anhydride, p-toluenesulfonic acid and its metal salts. The above nucleating agents may be used either alone or in combinations with each other. In particular embodiments, the nucleating agent is cyanuric acid. In certain embodiments, the nucleating agent can also be another polymer (e.g., polymeric nucleating agents such as PHB).

In certain embodiments, the nucleating agent is selected from: cyanuric acid, carbon black, mica talc, silica, boron nitride, clay, calcium carbonate, synthesized silicic acid and salts, metal salts of organophosphates, and kaolin. In particular embodiments, the nucleating agent is cyanuric acid.

In various embodiments, where the nucleating agent is dispersed in a liquid carrier, the liquid carrier is a plasticizer, e.g., a citric compound or an adipic compound, e.g., acetyl-citrate tributyrate (CITROFLEX® A4, Vertellus, Inc., High Point, N.C.), or DBEEA (dibutoxyethoxyethyl adipate), a surfactant, e.g., Triton X-100, TWEEN-20, TWEEN-65, Span-40 or Span 85, a lubricant, a volatile liquid, e.g., chloroform, heptane, or pentane, a organic liquid or water.

In other embodiments, the nucleating agent is aluminum hydroxy diphosphate or a compound comprising a nitrogen-containing heteroaromatic core. The nitrogen-containing heteroaromatic core is pyridine, pyrimidine, pyrazine, pyridazine, triazine, or imidazole.

In particular embodiments, the nucleating agent can include aluminum hydroxy diphosphate or a compound comprising a nitrogen-containing heteroaromatic core. The nitrogen-containing heteroaromatic core is pyridine, pyrimidine, pyrazine, pyridazine, triazine, or imidazole. The nucleant can have a chemical formula selected from the group consisting of

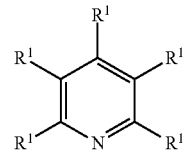

Formula 1

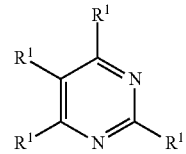

Formula 2

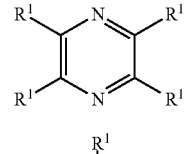

Formula 3

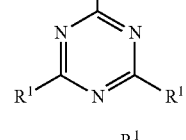

Formula 4

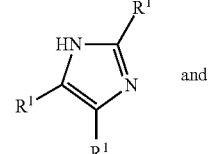

and

Formula 5

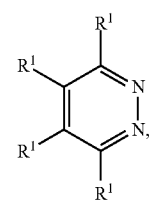

Formula 6 and combinations thereof, wherein each R1 is independently H, $NR^2R^2$, $OR^2$, $SR^2$, $SOR^2$, $SO_2R^2$, CN, $COR^2$, $CO_2R^2$, $CONR^2R^2$, $NO_2$, F, Cl, Br, or I; and each $R^2$ is independently H or $C_1$-$C_6$ alkyl.

The nucleating agent can be a nucleating agent as described in U.S. Published Application No. US 2005/0209377, by Allen Padwa, which is herein incorporated by reference in its entirety.

Another nucleating agent for use in the compositions and methods described herein are milled as described in International Publication No. WO 2009/129499, published in English on Oct. 22, 2009, and which designates the United States, which is herein incorporated by reference in its entirety. Briefly, the nucleating agent is milled in a liquid carrier until at least 5% of the cumulative solid volume of the nucleating agent exists as particles with a particle size of 5 microns or less. The liquid carrier allows the nucleating agent to be wet milled. In other embodiments, the nucleating agent is milled in liquid carrier until at least 10% of the cumulative solid volume, at least 20% of the cumulative solid volume, at least 30% or at least 40%-50% of the nucleating agent can exist as particles with a particle size of 5 microns or less, 2 microns or less or 1 micron or less. In alternative embodiments, the nucleating agents is milled by other methods, such as jet milling and the like. Additionally, other methods is utilized that reduce the particle size.

The cumulative solid volume of particles is the combined volume of the particles in dry form in the absence of any other substance. The cumulative solid volume of the particles is determined by determining the volume of the particles before dispersing them in a polymer or liquid carrier by, for example, pouring them dry into a graduated cylinder or other suitable device for measuring volume. Alternatively, cumulative solid volume is determined by light scattering.

Application of the Compositions

For the fabrication of useful articles, the compositions described herein are processed preferably at a temperature above the crystalline melting point of the polymers but below the decomposition point of any of the ingredients (e.g., the additives described above, with the exception of some branching agents) of the polymeric composition. While in heat plasticized condition, the polymeric composition is processed into a desired shape, and subsequently cooled to set the shape and induce crystallization. Such shapes can include, but are not limited to, a fiber, filament, film, sheet, rod, tube, bottle, or other shape. Such processing is performed using any art-known technique, such as, but not limited to, extrusion, injection molding, compression molding, blowing or blow molding (e.g., blown film, blowing of foam), calendaring, rotational molding, casting (e.g., cast sheet, cast film), or thermoforming. Thermoforming is a process that uses films or sheets of thermoplastic. The polymeric composition is processed into a film or sheet. The sheet of polymer is then placed in an oven and heated. When soft enough to be formed it is transferred to a mold and formed into a shape.

During thermoforming, when the softening point of a semi-crystalline polymer is reached, the polymer sheet begins to sag. The window between softening and droop is usually narrow. It can therefore be difficult to move the softened polymer sheet to the mold quickly enough. Branching the polymer can be used to increase the melt strength of the polymer so that the sheet maintains is more readily processed and maintains its structural integrity. Measuring the sag of a sample piece of polymer when it is heated is therefore a way to measure the relative size of this processing window for thermoforming.

The compositions described herein can be processed into films of varying thickness, for example, films of uniform thickness ranging from 1-200 microns, for example, 10-75 microns, 75 to 150 microns, or from 50-100 microns. Film layers can additionally be stacked to form multilayer films of the same or varying thicknesses or compositions of the same or varying compositions.

Blow molding, which is similar to thermoforming and is used to produce deep draw products such as bottles and similar products with deep interiors, also benefits from the increased elasticity and melt strength and reduced sag of the polymer compositions described herein.

Articles made from the compositions can be annealed according to any of the methods disclosed in International Publication No. WO 2010/008445, which was published in English on Jan. 21, 2010, and designated the United States, and is titled "Branched PHA Compositions, Methods For Their Production, And Use In Applications," which was filed in English and designated the United States. This application is incorporated by reference herein in their entirety.

As disclosed herein, "annealing" and "heat treatment" means a treatment where the polymer composition processed to a product in nonliquid form is subsequently (i.e., after the film is formed) heated for a period of time. This has been found to provide surprising and unexpected properties of puncture toughness and tear resistance in the films comprising the compositions of the invention. Preferably the flat film is heated to about 80° C. to about 140° C. for about 5 seconds to about 90 minutes, more preferably to about 90° C. to about 130° C. for about 10 minutes to about 70 minutes, and most preferably to about 110° C. to about 125° C. for about 15 minutes to about 60 minutes.

The compositions described herein are provided in any suitable form convenient for an intended application. For example, the composition is provided in pellet for subsequent production of films, coatings, moldings or other articles, or the films, coatings, moldings and other articles.

The polymeric compositions of the present invention can be used to create, without limitation, a wide variety of useful products, e.g., automotive, consumer durable, consumer disposable, construction, electrical, medical, and packaging products. For instance, the polymeric compositions can be used to make, without limitation, films (e.g., packaging films, agricultural film, mulch film, erosion control, hay bale wrap, slit film, food wrap, pallet wrap, protective automobile and appliance wrap, etc.), bags (e.g., trash bags, grocery bags, food bags, compost bags, etc.), hygiene articles (e.g., diapers, feminine hygiene products, incontinence products, disposable wipes, etc.), coatings for pelleted products (e.g., pelleted fertilizer, herbicides, pesticides, seeds, etc.), packaging (including, but not limited to, packaging and containers for food and beverage products, cosmetic products, detergents and cleaning products, personal care products, pharmaceutical and wellness products), golf tees, caps and closures, agricultural supports and stakes, paper and board coatings (e.g., for cups, plates, boxes, etc.), thermoformed products (e.g., trays, containers, yoghurt pots, plant pots, noodle bowls, moldings, etc.), housings (e.g., for electronics items, e.g., cell phones, PDA cases, music player cases, computer cases, printers, calculators, LCD projectors, connectors, chip trays, circuit breakers, plugs, and the like), wire and cable products (including, but not limited to, wire, cable and coatings for wire and cable for vehicles, cars, trucks, airplanes, aerospace, construction, military, telecommunication, utility power, alternative energy, and electronics), industrial products (such as, but not limited to, containers, bottles, drums, materials handling, gears, bearings, gaskets and seals, valves, wind turbines, and safety equipment), products for transportation (such as, but not limited to, automotive aftermarket parts, bumpers, window seals, instrument panels, consoles, under hood electrical parts, and engine covers), appliances and appliance parts (such as, but not limited to, refrigerators, freezers, washers, dryers, toasters, blenders, vacuum cleaners, coffee makers, and mixers), articles for use in building and construction (such as, but not limited to, fences, decks and rails, floors, floor covering, pipes and fittings, siding, trim, windows, doors, molding, and wall coverings), consumer goods and parts for consumer goods (such as, but not limited to, power hand tools, rakes, shovels, lawn mowers, shoes, boots, golf clubs, fishing poles, and watercraft), healthcare equipment (including, but not limited to, wheelchairs, beds, testing equipment, analyzers, labware, ostomy, IV sets, wound care, drug delivery, inhalers, and packaging). In short, the polymeric products described herein can be used to make the items currently made from conventional petroleum-based polymers.

The specific examples below are to be construed as merely illustrative, and not limitative of the remainder of the disclosure in any way whatsoever. Without further elaboration, it is believed that one skilled in the art can, based on the description herein, utilize the present invention to its fullest extent. All publications cited herein are hereby incorporated by reference in their entirety.

EXAMPLES

Experimental Methods

Measurement of Tensile Properties

The control PLA homopolymer and the PLA blends were compression molded from pellets into plaques that were about 0.2 mm in thickness using a mold temperature of 200° C. The pellets were maintained at 200° C. for about one minute in the compression molder before they were quenched to room temperature. The tensile properties of these plaques were then measured on an Instron 3345 according to ASTM D882 at a speed of about 51 mm/min at room temperature. Modulus (MPa) was measured from the slope of the stress-strain curve, tensile elongation was measured as the % change in sample length before breaking, tensile strength (MPa) was measured as the maximum force achieved prior to breaking divided by the sample area (MPa) and the tensile toughness (J) was calculated as the area under the stress-strain curve. Tensile elongation to break and tensile toughness are the indicators that will be used to assess the toughness of the PLA control and of the various blends.

Measurement of Melt Strength and Viscosity

Melt strength, G', and viscosity, $\eta^*$, were measured using oscillatory torsional rheology. The measurements were performed using a TA Instruments AR2000 rheometer employing strain amplitude of 1%. First, pellets (or powder) were molded into 25 mm diameter discs that were about 1200 microns in thickness. The disc specimens were molded in a compression molder set at about 165-177° C., with the molding time of about 30 seconds. These molded discs were then placed in between the 25 mm parallel plates of the AR2000 rheometer, equilibrated at 185° C., and subsequently cooled to 160° C. for the frequency sweep test. A gap of 800-900 microns was used, depending on the normal forces exerted by the polymer. The melt density of PHB was determined to be about 1.10 g/cm$^3$ at 160° C.; this value was used in all the calculations.

Specifically, the specimen disc was placed between the platens of the parallel plate rheometer set at 185° C. After the final gap was attained, excess material from the sides of the platens was scraped. The specimen was then cooled to 160° C. where the frequency scan (from 625 rad/s to 0.10 rad/s) was then performed; frequencies lower than 0.1 rad/s were avoided because of considerable degradation over the long time it takes for these lower frequency measurements. The specimen loading, gap adjustment and excess trimming, all carried out with the platens set at 185° C., takes about 2½ minutes. This was controlled to within ±10 seconds to minimize variability and sample degradation. Cooling from 180° C. to 160° C. (test temperature) was accomplished in about four minutes. Exposure to 180° C. ensures a completely molten polymer, while testing at 160° C. ensures minimal degradation during measurement.

During the frequency sweep performed at 160° C., the following data was collected as a function of measurement frequency: $\eta^*$ or complex viscosity, G' or elastic modulus (elastic or solid-like contribution to the viscosity) and G" or loss modulus (viscous or liquid-like contribution to the viscosity). For purposes of simplicity, we will use G' measured at an imposed frequency of 0.25 rad/s as a measure of "melt strength." Higher G' translates to higher melt strength.

Measurement of Thermal Properties

The glass transition of a P3HB-4HB rubber phase was measured using a TA Instruments Q100 Differential scanning calorimeter (DSC) with autosampler. 8-12 mg of a PHA sample was carefully weighed into an aluminum pan and sealed with an aluminum lid. The sample was then placed in the DSC under a nitrogen purge and analyzed using a heat-cool-heat cycle. The heating/cooling range was −70° C. to 200° C. with a heating rate of 10° C./min and cooling rate of 5° C./min.

PLA and PHA Materials

The PLA material used in the following examples was 5040D from NatureWorks LLC. Four different PHA materials were blended with PLA. Their ID and composition were as follows:

PHA A: P3HB homopolymer

PHA B: Blend of 55-65% P3HB and 35-45% P3HB-4HB copolymer with 8-14% 4HB by weight PHA C: Blend of 34-38% P3HB, 22-26% P3HB-4HB copolymer with 8-14% 4HB by weight and 38-42% P3HB-4HB copolymer with 25-33% 4HB by weight PHA D: Blend of 10-14% P3HB, 46-50% P3HB-4HB copolymer with 8-14% 4HB by weight and 38-42% P3HB-4HB copolymer with 25-33% 4HB by weight The amorphous rubber phase in these PHA blends refers to the P3HB-4HB copolymer having 25-33% 4HB by weight. The high 4HB content of this copolymer suppresses the crystallinity of the 3HB component producing a fully amorphous copolymer having a $T_g$ in the range of −15 to −40° C. 1 shows a DSC thermogram of the rubber phase PHA with the Tg measured to be −15° C. Note that there was no Tm detected by DSC in this P3HB-4HB copolymer indicating that this is a fully amorphous material. According to the above description, PHA's A and B have no rubber phase component present while PHA's C and D have 38-42% by weight rubber phase component present (or total rubber phase). As will be shown in the following Examples, increasing the overall %4HB content in the blends does not promote increased toughness in PLA/PHA blends. Only when the PHA has high rubber phase content, are the toughness properties of the PLA/PHA blend enhanced.

Example 1

Preparation of PLA/PHA 70/30 Blends Using PHAs with 0 and 25-33% by Weight PHA Rubber Phase In this example, the mechanical properties of four PLA/PHA blends (all at 70/30 PLA/PHA ratio on a weight basis)

are compared to those of pure PLA (5040D from Natureworks) which is designated as the control. The PHA composition of these blend formulations are listed in the table below. The mechanical properties of particular interest were the tensile elongation to break and tensile toughness. The Formulations 1 to 4 were PLA/PHA 70/30 blends that were compounded on a 27 mm Leistritz co-rotating twin-screw extruder using the following temperature profile: 190/190/190/180/180/180/175/175/165/165 (° C.). The compounding was carried out at a screw speed of 150 rpm and a rate of about 90 lbs/hr. For these blends, the melt pressure was noted to be in the range 860-1180 psi. Table 1 summarizes the four formulation compositions and the tensile testing results.

TABLE 1

Summary of PLA/PHA 70/30 blend formulations with 0 and 25-33% PHA rubber phase and their tensile properties.

|  | Control | Formulation 1 | Formulation 2 | Formulation 3 | Formulation 4 |
|---|---|---|---|---|---|
| Blend Composition | | | | | |
| PLA | 100 | 70 | 70 | 70 | 70 |
| PHA A 0% rubber phase | 0 | 30 | 0 | 0 | 0 |
| PHA B 0% rubber phase | 0 | 0 | 30 | 0 | 0 |
| PHA C 25-33% rubber phase | 0 | 0 | 0 | 30 | 0 |
| PHA D 25-33% rubber phase | 0 | 0 | 0 | 0 | 30 |
| Total (wt %) | 100 | 100 | 100 | 100 | 100 |
| Mechanical Properties | | | | | |
| Modulus (MPa) | 2700 | 2365 | 2378 | 1908 | 1879 |
| Tensile Strength (MPa) | 60.8 | 22.0 | 19.1 | 39.4 | 36.7 |
| Tensile Elongation (%) | 4 | 130 | 84 | 215 | 204 |
| Tensile Toughness (J) | 0.05 | 1.11 | 0.65 | 1.65 | 1.50 |

PHA A: P3HB homopolymer
PHA B: Blend of 55-65% P3HB and 35-45% P3HB-4HB copolymer with 8-14% 4HB by weight
PHA C: Blend of 34-38% P3HB, 22-26% P3HB-4HB copolymer with 8-14% 4HB by weight and 38-42% P3HB-4HB copolymer with 25-33% 4HB by weight
PHA D: Blend of 10-14% P3HB, 46-50% P3HB-4HB copolymer with 8-14% 4HB by weight and 38-42% P3HB-4HB copolymer with 25-33% 4HB by weight

TABLE 2

Relative tensile elongation and toughness improvements of PLA/PHA 70/30 blends with 0 and 25-33% rubber phase.

| Relative Mechanical Properties* | Formulation 1 | Formulation 2 | Formulation 3 | Formulation 4 |
|---|---|---|---|---|
| Tensile Elongation | 33 | 21 | 54 | 51 |
| Tensile Toughness | 22 | 13 | 33 | 30 |

*Relative tensile property defined as PLA blend value/PLA Control value.

As shown in Tables 1 and 2, the addition of PHA containing 0% rubber phase already resulted in considerable improvements in toughness to the PLA i.e. a 21 to 33-fold increase in tensile elongation to break and a 13 to 22-fold increase in tensile toughness. While these improvements were considerable, they were not as significant as the improvements reported for PLA/PBSA blends in U.S. Pat. No. 5,883,199. However, as seen in Tables 1 and 2, the addition of a PHA with 25-33% rubber phase to PLA resulted in an even larger improvement i.e. 51 to 54-fold increase in tensile elongation to break and 30 to 33 fold increase in toughness. The level of improvement achieved was noted to be more significant compared to the reported values for PLA/PBSA blends. This indicated that a P3HB-4HB copolymer with a 25-33% 4HB, fully amorphous rubber phase was a considerably more efficient impact modifier for PLA relative to P3HB homopolymer or P3HB-4HB copolymer with no rubber phase or PBSA present.

Example 2

Preparation of PLA/PHA Compositions Reactively Blended with Peroxides and Co-agents Using PHAs with 25-33% by Weight Rubber Phase Reactive extrusion of the PLA and the PHA in the presence of a reactive moiety such as an organic peroxide improves the interaction between the two polymers such that an even tougher blend is produced. This example demonstrates an even tougher PLA/PHA blend through the use of the reactive extrusion approach.

Blend formulations 6 and 7 in the table below are PLA/PHA blends that were compounded on a 27 mm Leistritz co-rotating twin-screw extruder using the following temperature profile: 190/190/190/180/180/180/175/175/165/165 (° C.). The compounding was carried out at a screw speed of 150 rpm and a rate of about 90 lbs/hr. For these blends, the melt temperature was noted to be in the range 188-192° C. and the melt pressure was noted to be in the range 780-1120 psi. The PHA employed in these blends has a rubber phase content of 25-33%. This rubber phase was fully-amorphous with a $T_g$ of about −15° C. (see FIG. 1).

A small amount (approximately 5 weight percent) of a monomeric plasticizer (CITROFLEX® A4) was also included in these blends. While Formulation 6 was simply a physical blend of the components, Formulation 7 was prepared in the presence of an organic peroxide (TRIGONOX® 131, Akzo Nobel) and pentaerythritol triacrylate co-agent (PE3A, Sartomer). The organic peroxide/co-agent additives can help enhance the interactions between the PLA and PHA resins and thereby improve the PLA/PHA blend toughness even further.

The PLA control and the blends were compression molded from pellets into plaques that were about 0.2 mm in thickness using a mold temperature of about 200° C. The pellets were maintained at 200° C. for about one minute in the compression molder before they were quenched to room temperature. The tensile properties of these plaques were measured using an Instron 3345 according to ASTM D882 at a speed of about 51 mm/min at room temperature. These properties are summarized in the table below:

TABLE 3

Summary of PLA/PHA (with 25-33% rubber phase) reactively melt blended formulations and their tensile properties.

|  | PLA Control | Formulation 6 | Formulation 7 |
|---|---|---|---|
| Blend Composition | | | |
| PLA | 100 | 65 | 65 |
| PHA C | 0 | 30 | 30 |

TABLE 3-continued

Summary of PLA/PHA (with 25-33% rubber phase) reactively melt blended formulations and their tensile properties.

|  | PLA Control | Formulation 6 | Formulation 7 |
|---|---|---|---|
| CITROFLEX ® A4 | 0 | 5 | 4.6 |
| TRIGONOX ® 131 | 0 | 0 | 0.2 |
| PE3A Coagent | 0 | 0 | 0.2 |
| Total (wt %) | 100 | 100 | 100 |
| Mechanical Properties | | | |
| Modulus (MPa) | 2700 | 1808 | 1724 |
| Tensile Strength (MPa) | 60.8 | 29.6 | 38.5 |
| Tensile Elongation (%) | 4 | 181 | 237 |
| Tensile Toughness (J) | 0.05 | 1.10 | 1.74 |

PHA C: Blend of 34-38% P3HB, 22-26% P3HB-4HB copolymer with 8-14% 4HB by weight and 38-42% P3HB-4HB copolymer with 25-33% 4HB by weight Tensile elongation to break and tensile toughness (area under the stress-strain curve) are the indicators that were used to assess the toughness of the PLA control and of the various blends. The table above shows that with reactive blending, the tensile strength and toughness improve further as compared to the nonreacted PHA/PLA blend. The table below lists the relative improvement (property of subject blend divided by the same property of the PLA control) in these toughness measurements for the subject blends.

TABLE 4

Relative tensile elongation and toughness improvements of PLA/PHA blend with 25-33% rubber phase reactively melt blended.

| Relative Mechanical Properties* | Formulation 3 | Formulation 6 | Formulation 7 |
|---|---|---|---|
| Tensile Elongation | 54 | 45 | 59 |
| Tensile Toughness | 33 | 22 | 35 |

*Relative tensile property defined as PLA blend value/PLA Control value.

The toughness improvements, relative to pure PLA, were significant for Formulation 6 which contained PHA with 25-33% rubber phase and 5% by weight CITROFLEX® A4 as a plasticizer. In comparison to the results in Table 1 for Formulation 3 (PHA C), the addition of 5% citrate ester appeared to decrease the elongation to break by ~16% and toughness by ~33% as shown in Table 4. However, the toughness and elongation improved as observed for Formulation 7 by reactively blending with the organic peroxide/co-agent additives. This improvement over the no reactive blending formulation (31% increase in elongation and 60% in toughness) was attributed to the synergistic interactions between PLA and PHA during their reactive melt-blending.

Example 3

Preparation of PLA/PHA Compositions Reactively Blended with Peroxides, Co-agents and Dendritic Polyester Using PHA's with 25-33% Rubber Phase This example demonstrates the efficacy of reactive melt-blending of PLA and PHA, resulting in a blend that is even tougher than the PLA/PBSA benchmark.

Blend Formulations 8, 9 and 10 as shown in Table 5 were PLA/PHA 70/30 blends compounded on a 16 mm PRISM co-rotating twin-screw extruder using the following temperature profile: 200/200/190/190/180/180/170/170 (° C.). The compounding was carried out at a screw speed of 150 rpm. The PHA employed in these blends contained 25-33% PHA rubber phase. The rubber phase was fully amorphous with a $T_g$ of about −15° C. (see FIG. 1). A small amount of a monomeric plasticizer (CITROFLEX® A4) was also included in these blends. While Formulation 8 was simply a physical blend of the components, Formulations 9 and 10 were prepared in the presence of an organic peroxide, which can help enhance the interactions between the PLA and PHA. For Formulation 10, a highly-branched dendritic polyester (BOLTRON™ H20, Perstorp) with more than 10 primary hydroxyl groups was also included to see the effect on the final PLA/PHA tensile toughness.

The control PLA and the blends were compression molded from pellets into plaques that were about 0.2 mm in thickness using a mold temperature of about 200° C. The pellets were maintained at 200° C. for about one minute in the compression molder before they were quenched to room temperature. The tensile properties of these plaques were then measured using an Instron 3345 according to ASTM D882 at a speed of about 51 mm/min at room temperature. A summary of the tensile properties are listed in Table 5 below:

TABLE 5

Summary of PLA/PHA with 25-33% rubber phase reactively melt blended formulations and their tensile properties.

|  | PLA Control | Formulation 8 | Formulation 9 | Formulation 10 |
|---|---|---|---|---|
| Blend Composition | | | | |
| PLA | 100 | 65 | 65 | 65 |
| PHA C | 0 | 30 | 30 | 30 |
| CITROFLEX ® A4 | 0 | 5 | 4.6 | 2.6 |
| TRIGONOX ® 131 | 0 | 0 | 0.2 | 0.2 |
| PE3A Coagent | 0 | 0 | 0.2 | 0.2 |
| BOLTRON ™ H20 | 0 | 0 | 0 | 2 |
| Total (wt %) | 100 | 100 | 100 | 100 |
| Mechanical Properties | | | | |
| Modulus (MPa) | 2892 | 1780 | 1826 | 1789 |
| Tensile Strength (MPa) | 61.5 | 28.5 | 38.2 | 38.1 |
| Tensile Elongation (%) | 4 | 169 | 206 | 213 |
| Tensile Toughness (J) | 0.04 | 0.95 | 1.35 | 1.45 |

PHA C: Blend of 34-38% P3HB, 22-26% P3HB-4HB copolymer with 8-14% 4HB by weight and 38-42% P3HB-4HB copolymer with 25-33% 4HB by weight Tensile elongation to break and tensile toughness (area under the stress-strain curve) are the indicators used to assess the toughness of the PLA control and of the various blends. The table below lists the relative improvement (property of subject blend divided by the same property of the PLA control) in these toughness measures for the subject blends.

TABLE 6

Relative tensile elongation and toughness improvements of 70/30 PLA/PHA with 25-33% rubber phase reactively melt blended.

| Relative Mechanical Properties* | Formulation 8 | Formulation 9 | Formulation 10 |
|---|---|---|---|
| Tensile Elongation | 42 | 52 | 53 |
| Tensile Toughness | 24 | 34 | 36 |

*Relative tensile property defined as PLA blend value/PLA Control value.

The toughness improvements, relative to PLA, was significant for Formulation 8 which contained the 25-33% PHA rubber phase and 5% by weight CITROFLEX® A4 processing aid. As seen in Table 6, the improvement in elongation and toughness over pure PLA with the rubber phase PHA/citrate ester with no reactive blending was significant (42-fold increase in elongation to break and 24-fold increase in toughness). However the addition of citrate ester plasticizer slightly decreased the overall toughness. After reactive blending with the organic peroxide and co-agent, the toughness and elongation increased further relative to the pure PLA even with the citrate ester present (52-fold increase in elongation and table are results for a control sample which was composed of 100% by weight PLA without any additives or branching agents.

A small amount (approximately 5 weight percent) of a monomeric plasticizer (CITROFLEX® A4) was also included in the blends. The formulations were prepared in the presence of an organic peroxide (TRIGONOX® 131, Akzo Nobel) and pentaerythritol triacrylate co-agent (PE3A, Sartomer). The organic peroxide/co-agent additives help enhance the interactions between the PLA and PHA resins and thereby improve the PLA/PHA blend toughness even further.

The eleven formulations and one control sample were processed on a 27 mm Leistritz co-rotating twin-screw extruder using the following temperature profile: 190/190/190/180/180/180/175/175/165/165 (° C.). The compounding was carried out at a screw speed of 150 rpm and a rate of about 90 lbs/hr. The PHA C employed in these blends had a rubber phase content of 25-33% by weight. This rubber phase was fully-amorphous with a $T_g$ of about −15° C. (see FIG. 1).

The PLA control and the blends were then compression molded from pellets into plaques and the tensile properties of these plaques measured at room temperature. Discs were also compression molded from the pellets and the melt strength and viscosity were measured. Table 7 summarized the tensile and melt property results for the blends and PLA control.

TABLE 7

Summary of melt rheological and tensile properties for reactively blended PLA/PHA formulations with 25-33% PHA rubber phase.

| Formulation | 11 | 12 | 13 | 14 | 15 | 16 | 17 | 18 | 19 | 20 | 21 | 22 |
|---|---|---|---|---|---|---|---|---|---|---|---|---|
| PLA (wt %) | 85 | 75 | 65 | 55 | 45 | 35 | 25 | 15 | 5 | 0 | 95 | 100 |
| PHA C (wt %) | 10 | 20 | 30 | 40 | 50 | 60 | 70 | 80 | 90 | 95 | 0 | 0 |
| CITROFLEX ® A4 (wt %) | 4.6 | 4.6 | 4.6 | 4.6 | 4.6 | 4.6 | 4.6 | 4.6 | 4.6 | 4.6 | 4.6 | 0 |
| TRIGANOX ® 131 Peroxide (wt %) | 0.2 | 0.2 | 0.2 | 0.2 | 0.2 | 0.2 | 0.2 | 0.2 | 0.2 | 0.2 | 0.2 | 0 |
| PE3A Co-agent (wt %) | 0.2 | 0.2 | 0.2 | 0.2 | 0.2 | 0.2 | 0.2 | 0.2 | 0.2 | 0.2 | 0.2 | 0 |
| Total (Wt %) | 100 | 100 | 100 | 100 | 100 | 100 | 100 | 100 | 100 | 100 | 100 | 100 |
| Melt Rheological and Mechanical Properties | | | | | | | | | | | | |
| G' @ 0.25 rad/s (Pa) | 3395 | 1431 | 1285 | 1307 | 1390 | 877 | 855 | 932 | 679 | 718 | 911 | 184 |
| η* @ 0.25 rad/s (Pa.s) | 23220 | 12610 | 10680 | 10570 | 10770 | 7686 | 7081 | 7955 | 6608 | 7054 | 14110 | 9306 |
| Tensile Modulus (MPa) | 1877 | 1605 | 1379 | 1485 | 1026 | 971 | 798 | 663 | 573 | 529 | 2631 | 2839 |
| Tensile Break Stress (MPa) | 18.8 | 28.9 | 29.1 | 32.3 | 15.4 | 18.8 | 23.8 | 22.8 | 19.1 | 22.7 | 46.1 | 54.6 |
| Tensile Elongation (%) | 22 | 197 | 232 | 247 | 157 | 252 | 397 | 468 | 456 | 570 | 5 | 6 |
| Tensile Toughness (J) | 0.17 | 1.43 | 1.85 | 1.89 | 0.88 | 1.34 | 2.06 | 2.25 | 2.22 | 2.71 | 0.07 | 0.08 |

PHA C: Blend of 34-38% P3HB, 22-26% P3HB-4HB copolymer with 8-14% 4HB by weight and 38-42% P3HB-4HB copolymer with 25-33% 4HB by weight 34-fold increase in toughness). This difference was attributable to the synergistic interactions between PLA and PHA during their reactive melt-blending. Reactive blending with the addition of the BOLTRON™ H20 to the PLA/PHA/peroxide/co-agent blend did showed a marginal improvement in tensile toughness as compared to the PLA/PHA/peroxide/co-agent blend but still significantly higher than the pure PLA.

Example 4

Preparation of PLA/PHA Compositions Reactively Blended with Peroxide and Co-agent Using PHAs with 25-33% Rubber Phase In this example, PLA/PHA blends with PLA content from 0-95% were prepared by reactive extrusion, similarly to those formulations in Example 2, above. A total of eleven PLA/PHA blend formulations were prepared. Table 7 shows the formulation's composition and testing results. Included in the The data in Table 7 shows that for PLA alone (Formulations 21 and 22) the addition of branching and co-agents improved the melt strength and viscosity significantly. However the tensile properties, especially the toughness, did not change from that of the unbranched PLA. When PHA with 25-33% rubber phase was added, the toughness, elongation, break stress, melt strength and viscosity all improved significantly. FIGS. 2, 3, 4 and 5 plot the tensile properties versus the weight % PHA C in the blends. The modulus was shown to generally decrease monotonically with the wt % PHA C added to PLA. The toughness, elongation and break stress all showed a maximum at a PLA/PHA ratio of 65/30 to 55/40 or about 32-42% by wt PHA. After about 55% wt PHA, the elongation and toughness started to increase as the major phase essentially became the PHA with rubber phase. The break stress did not increase monotonically as did the elongation and toughness. The melt properties of the blends on the other hand, appeared to show a maximum at a PLA/PHA ratio of 85/10 or 10.5% PHA. The results show that depending on the final blend properties that are desired, different PLA/PHA blend ratios may be necessary.

Other than in the examples herein, or unless otherwise expressly specified, all of the numerical ranges, amounts, values and percentages, such as those for amounts of materials, elemental contents, times and temperatures of reaction, ratios of amounts, and others, in the following portion of the specification and attached claims may be read as if prefaced by the word "about" even though the term "about" may not expressly appear with the value, amount, or range. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains error necessarily resulting from the standard deviation found in its underlying respective testing measurements. Furthermore, when numerical ranges are set forth herein, these ranges are inclusive of the recited range end points (i.e., end points may be used). When percentages by weight are used herein, the numerical values reported are relative to the total weight.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10. The terms "one," "a," or "an" as used herein are intended to include "at least one" or "one or more," unless otherwise indicated.

Any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

While this invention has been particularly shown and described with references to preferred embodiments thereof, it will be understood by those skilled in the art that various changes in form and details may be made therein without departing from the scope of the invention encompassed by the appended claims.

What is claimed is:

1. A composition comprising a polymer blend, said polymer blend comprising:
    polylactic acid (PLA); and
    a polyhydroxyalkanoate (PHA) blend comprising the following polyhydroxyalkanoates (PHAs):
        a poly(3-hydroxybutyrate) homopolymer (PHB);
        a first poly(3-hydroxybutyrate) copolymer having a glass transition temperature ($T_g$) in the range of 6° C. to −10° C., and a melting temperature ($T_M$) of 80° C. to 180° C. (a Type 1 PHB copolymer); and
        a second poly(3-hydroxybutyrate) copolymer having $T_g$ of −20° C. to −50° C. and $T_M$ of 55° C. to 90° C. (a Type 2 PHB copolymer),
    wherein:
        the content of the PHB in the PHA blend is in the range of 10% to 90% by weight of the combined content of the PHAs in the PHA blend,
        the content of the Type 1 PHB copolymer in the PHA blend is in the range of 5% to 90% by weight of the combined content of the PHAs in the PHA blend, and
        the content of the Type 2 PHB copolymer in the PHA blend is in the range of 5% to 90% by weight of the combined content of the PHAs in the PHA blend, and further wherein:
        the PHA blend has a $T_g$ between about −5° C. and about −50° C.; and
        the PHA blend is a multiphase blend including an amorphous rubber phase having a $T_g$ between −15° C. and −40° C., and wherein the content of the amorphous rubber phase in the PHA blend is between 5 weight % and 45 weight % of the combined content of the PHAs in the the PHA blend.

2. The composition of claim 1, wherein the PHA blend comprises three phases.

3. The composition of claim 1, wherein the composition further comprises a branching agent.

4. The composition of claim 3, wherein the branching agent is selected from:
    dicumyl peroxide, t-amyl-2-ethylhexyl peroxycarbonate, 1,1-bis(t-butylperoxy)-3,3,5-trimethylcyclohexane, 2,5-dimethyl-2,5-di(t-butylperoxy) hexane, 2,5-dimethyl-2,5-di(t-amyl peroxy) hexane, 2,5-bis(t-butylperoxy)-2,5-dimethylhexane, 2,5-dimethyl-di(t-butylperoxy)hexyne-3, di-t-butyl peroxide, benzoyl peroxide, di-t-amyl peroxide, t-butyl cumyl peroxide, n-butyl-4,4-bis(t-butylperoxy)valerate, 1,1-di(t-butylperoxy)-3,3,5-trimethyl-cyclohexane, 1,1-di(t-butylperoxy)cyclohexane, 1,1-di(t-amylperoxy)-cyclohexane, 2,2-di(t-butylperoxy)butane, ethyl-3,3-di(t-butylperoxy) butyrate, 2,2-di(t-amylperoxy)propane, ethyl-3,3-di(t-amylperoxy)butyrate, t-butylperoxy-acetate, t-amylperoxyacetate, t-butylperoxybenzoate, t-amylperoxybenzoate, and di-t -butyldiperoxyphthalate or combinations thereof.

5. The composition of claim 3, wherein the concentration of branching agent is between about 0.001% to about 0.5% by weight of the blend composition.

6. The composition of claim 3, wherein the composition further comprises a co-agent for reacting with the polymer blend composition.

7. The composition of claim 6, wherein the co-agent is diallyl phthalate, pentaerythritol tetraacrylate, trimethylolpropane triacrylate, pentaerythritol triacrylate, dipentaerythritol pentaacrylate, diethylene glycol dimethacrylate, bis (2-methacryloxyethyl) phosphate, or combinations thereof.

8. The composition of claim 6, wherein the co-agent is pentaerythritol triacrylate or diethylene glycol dimethacrylate.

9. The composition of claim 6, wherein the co-agent is an epoxy-functional styrene-acrylic polymer, an epoxy-functional acrylic copolymer, an epoxy-functional polyolefin copolymer, an oligomer comprising a glycidyl group with an epoxy functional side chain, an epoxy-functional poly(ethylene-glycidyl methacrylate-co-methacrylate), or an epoxidized oil or combinations thereof.

10. The composition of claim 3, further comprising a nucleating agent such as carbon black, cyanuric acid, uracil, thymine, mica, talc, silica, boron nitride, barium nitride, clay, calcium carbonate, synthesized silicic acid and salts, metal salts of organophosphates, and kaolin or combination thereof.

11. A method of preparing a polymer blend comprising polylactic acid (PLA) and a polyhydroxyalkanoate (PHA) blend, the method comprising:
melt blending the composition of claim 3, thereby forming the polymer blend comprising PLA and the PHA blend.

12. A method of preparing a branched polymer blend comprising polylactic acid (PLA) and a polyhydroxyalkanoate (PHA) blend, the method comprising:
melt reacting the composition of claim 3, wherein the PHA blend includes a fully amorphous phase with a $T_g$ below 20° C. and wherein the content of the fully amorphous rubber phase in the PHA blend is between 5-45% by weight of the combined content of the PHAs in the PHA blend,
thereby forming the branched polymer blend.

13. The composition of claim 1, wherein the amorphous rubber phase is a copolymer of 3-hydroxybutyrate (3HB) and 4-hydroxybutyrate (4HB), wherein the content of 4HB in the amorphous rubber phase copolymer is from about 25% to about 50% by weight.

14. The composition of claim 1, wherein the amorphous rubber phase is a copolymer of 3-hydroxybutyrate (3HB) and 4-hydroxybutyrate (4HB), wherein the content of 4HB in the amorphous rubber phase copolymer is from about 25% to about 40% by weight.

15. The composition of claim 1, wherein the amorphous rubber phase is a copolymer of 3-hydroxybutyrate (3HB) and 4-hydroxybutyrate (4HB), wherein the content of 4HB in the amorphous rubber phase copolymer is from about 25% to about 35% by weight.

16. The composition of claim 1, wherein the amorphous rubber phase is a copolymer of 3-hydroxybutyrate (3HB) and 3-hydroxyhexanoate (3HH), wherein the content of 3HH in the amorphous rubber phase copolymer is from about 25% to about 50% by weight.

17. The composition of claim 1, wherein the amorphous rubber phase is a copolymer of 3-hydroxybutyrate (3HB) and 5-hydroxyvalerate (5HV), wherein the content of 5HV in the amorphous rubber phase copolymer is from about 25% to about 60% by weight.

18. The composition of claim 1, wherein the amorphous rubber phase is a copolymer of 3-hydroxybutyrate (3HB) and 3-hydroxyoctoate (HO), wherein the content of HO in the amorphous rubber phase copolymer is from about 15% to about 60% by weight.

19. The composition of claim 1, wherein the amorphous rubber phase has no melting point.

20. The composition of claim 1, wherein the content of PHA blend in the polymer blend is from about 1% to about 50% by weight.

21. The composition of claim 1, wherein the content of PHA in the polymer blend is from about 10% to about 40% by weight.

22. The composition of claim 1, wherein the content of PHA in the polymer blend is from about 20% to about 30% by weight.

23. The composition of claim 1, wherein the weight average molecular weight of the amorphous rubber phase is between about 100,000 to about 600,000 daltons.

24. The composition of claim 1, further comprising one or more additives.

25. The composition of claim 24, wherein the additive is selected from plasticizers, clarifiers, nucleating agents, thermal or oxidative stabilizers, inorganic fillers, anti-slip agents, compatibilizers, blocking agents or a combination thereof.

26. The composition of claim 25, wherein the compatibilizer is maleic anhydride.

27. The composition of claim 1, further comprising a dendritic or hyperbranched polyester.

28. The composition of claim 1, wherein the amorphous rubber phase is a copolymer of 3HB and 4HB, wherein the content of 4HB in the amorphous rubber phase copolymer is from about 25% to about 50% by weight, and the composition further comprises 2,5-dimethyl-2,5-di(t-butylperoxy) hexane, diethylene glycol dimethacrylate, and one or more additives selected from plasticizers, clarifiers, nucleating agents, thermal stabilizers, oxidative stabilizers, inorganic fillers, anti-slip agents, compatibilizers and blocking agents.

29. A multilayer laminate comprising at least one film layer comprising the composition of claim 1.

30. The multilayer laminate of claim 29, wherein the film has a thickness of about 1 to about 2 microns.

31. An article made with the laminate of claim 30.

32. A film comprising the composition of claim 1.

33. An article comprising the composition of claim 1.

34. The article of claim 33, wherein the article having about 31% to about 58% greater tensile elongation with about 21 to about 35% greater tensile toughness than a corresponding polymer article consisting only of PLA polymer.

35. The film of claim 32, wherein the film has increased tensile elongation and toughness according ASTM D822 relative to a corresponding PLA/PBSA polymer blend film.

36. The composition of claim 1, wherein the PHA blend is a multiphase blend including:
34-38% by weight of poly(3-hydroxybutyrate) (P3HB),
22-26% by weight of poly(3-hydroxybutyrate-4-hydroxybutyrate) (P3HB-4HB) copolymer having 8-14% of 4HB by weight, and
38-42% by weight of P3HB-4HB copolymer having 25-33% of 4HB by weight,
the composition further comprising:
2,5-dimethyl-2,5-di(t-butylperoxy) hexane, diethylene glycol dimethacrylate, and one or more additives selected from plasticizers, clarifiers, nucleating agents, thermal stabilizers, oxidative stabilizers, inorganic fillers, anti-slip agents, compatibilizers and blocking agents.

* * * * *